US007670013B2

United States Patent
Mimura

(10) Patent No.: US 7,670,013 B2
(45) Date of Patent: Mar. 2, 2010

(54) TRIANGULAR-PYRAMIDAL CUBE-CORNER RETROREFLECTIVE ARTICLE HAVING CURVED REFLECTIVE LATERAL FACE

(75) Inventor: Ikuo Mimura, Toyama (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/581,490

(22) PCT Filed: Dec. 2, 2004

(86) PCT No.: PCT/JP2004/018329

§ 371 (c)(1),
(2), (4) Date: Aug. 10, 2006

(87) PCT Pub. No.: WO2005/054909

PCT Pub. Date: Jun. 16, 2005

(65) Prior Publication Data

US 2007/0109641 A1    May 17, 2007

(30) Foreign Application Priority Data

Dec. 2, 2003  (JP) ............................. 2003-402393
Jan. 14, 2004 (JP) ............................. 2004-006445

(51) Int. Cl.
*G02B 5/126* (2006.01)
(52) U.S. Cl. ..................... 359/534; 359/530; 428/167
(58) Field of Classification Search ......... 359/515–553; 428/156, 167

See application file for complete search history.

(56) References Cited

U.S. PATENT DOCUMENTS

| 2,310,790 A | 2/1943 | Jungersen | 88/105 |
| 3,712,706 A | 1/1973 | Stamm | 350/103 |
| 4,712,867 A * | 12/1987 | Malek | 359/539 |
| 4,775,219 A | 10/1988 | Appeldorn et al. | 350/103 |
| 5,138,488 A | 8/1992 | Szczech | 359/529 |
| 5,171,624 A | 12/1992 | Walter | 428/156 |
| 5,565,151 A | 10/1996 | Nilsen | 264/1.1 |
| 5,840,406 A | 11/1998 | Nilsen | 428/156 |
| 5,919,551 A * | 7/1999 | Cobb et al. | 428/156 |
| 6,083,607 A | 7/2000 | Mimura et al. | 428/167 |

(Continued)

FOREIGN PATENT DOCUMENTS

| EP | 0 137 736 | 10/1992 |
| EP | 0 548 280 | 9/1994 |
| JP | 5-150368 | 6/1993 |
| JP | 2001-033609 | 2/2001 |
| WO | WO 99/36806 | 7/1999 |
| WO | WO 01/20373 | 3/2001 |

*Primary Examiner*—Stephone B Allen
*Assistant Examiner*—Jennifer L. Doak
(74) *Attorney, Agent, or Firm*—Fitzpatrick, Cella, Harper & Scinto

(57) ABSTRACT

To provide a retroreflective article formed of many triangular-pyramidal cube-corner retroreflective element pairs. One-side groove angle formed between a cross line between a plane vertical to the common plane and to a V-groove vertical plane which includes the base line of a V-shaped groove is vertical to the common plane, and a reflective lateral face containing the base line of the V-shaped groove, and the V-groove vertical plane, does not form a constant angle in the reflective lateral face but the lateral face forms a curved and/or multiple surface. A base line constituting any directional V-shaped groove in retroreflective element pairs is a nonlinear base line which does not form a linear trajectory and the reflective lateral face formed of the V-shaped groove forms a curved and/or multiple surface.

13 Claims, 15 Drawing Sheets

U.S. PATENT DOCUMENTS

| | | | |
|---|---|---|---|
| 6,318,866 B1 | 11/2001 | Mimura et al. | 359/530 |
| 6,390,629 B1 | 5/2002 | Mimura et al. | 359/530 |
| 6,685,323 B1 | 2/2004 | Mimura et al. | 359/530 |
| 6,942,350 B2 | 9/2005 | Mimura et al. | 359/530 |
| 2002/0154408 A1* | 10/2002 | Minoura et al. | 359/529 |
| 2007/0065636 A1* | 3/2007 | Merrill et al. | 428/141 |

* cited by examiner (a) (Prior Art)   (b) (Prior Art)   (c) (Prior Art)

TRIANGULAR-PYRAMIDAL CUBE-CORNER RETROREFLECTIVE ARTICLE HAVING CURVED REFLECTIVE LATERAL FACE

TECHNICAL FIELD

The present invention relates to a retroreflective article such as a triangular-pyramidal cube-corner retroreflective sheeting having a new structure. More particularly, the present invention relates to a retroreflective article such as a cube-corner retroreflective sheeting in which triangular-pyramidal cube-corner reflective elements having a new structure (hereafter referred to as triangular-pyramidal reflective elements or simply referred to as reflective elements) are arranged in a closest-packed state by sharing their base line.

Particularly, the present invention relates to a retroreflective article such as a cube-corner retroreflective sheeting constituted of triangular-pyramidal cube-corner retroreflective elements useful for signs such as a road sign (general traffic sign or delineator), road mark (pavement marker), and work sign, number plate of a vehicle such as an automobile or motorcycle, reflecting tape attached to the body of a truck or trailer, safety material such as apparel or lifesaver, marking such as signboard, and reflector used for visible-light, laser-beam, or infrared-light reflective sensor.

More particularly, the present invention relates to a retroreflective article formed of many triangular-pyramidal cube-corner retroreflective-element pairs formed of parallel V-shaped groove groups (x, x, x . . . , y, y, y, . . . , and z, z, z . . . ) from three directions such as x direction, y direction, and z direction and set on a common plane (S-S'), characterized in that one-side groove angle (GLx, GRx, GLy, GRy, GLz, or GRz) formed between a cross line between plane vertical to the common plane (S-S') and a V-groove vertical a plane vertical to the common plane (S-S') and also to a V-groove vertical plane (Svx, Svy, or Svz) which is vertical to the common plane (S-S') and contains the base line of the V-shaped groove, and a reflective lateral face (a1, b1, c1, a2, b2, or c2) containing the base line of the V-shaped groove intersect, and the V-groove vertical plane does not form a constant angle in the reflective lateral face but the reflective lateral face forms a curved and/or multiple surface.

Further particularly, the present invention relates to a retroreflective article formed of many triangular-pyramidal cube-corner retroreflective element pairs characterized in that a constant angle is not formed with the maximum deviation of 0.0001 to 0.1° from a normal one-side groove angle (GLx, GRx, GLy, GRy, GLz, or GRz) at which the one-side groove angle forms a cube corner in at least one reflective lateral face for constituting the triangular-pyramidal cube-corner retroreflective element pairs and the reflective lateral face forms a curved and/or multiple surface.

Further particularly, in the case of a retroreflective article formed of V-shaped groove groups (x, x, x, . . . , y, y, y, . . . , and z, z, z . . . ) arranged at equal intervals from three directions and formed of many triangular-pyramidal cube-corner retroreflective element pairs arranged on the common plane (S-S') decided by base line groups of the V-shaped groove groups, the present invention relates to a retroreflective article formed of many triangular-pyramidal cube-corner retroreflective element groups characterized in that a base line constituting any-directional V-shaped groove in the retroreflective element pairs does not form a linear trajectory but it is nonlinear bottom plane but it forms a curved and/or multiple surface.

Further particularly, the present invention relates to a retroreflective article formed of many triangular-pyramidal cube-corner retroreflective element pairs characterized in that a non-linear factor (fx, fy, or fz) specified by the maximum distance between the intersection of the vertical line from a both-end straight line obtained by connecting both ends of a non-linear base line to the non-linear base line ranges between 0.0001 L and 0.05 L when assuming the length of the both-end straight line as L.

BACKGROUND ART

A retroreflective sheeting for reflecting incoming rays toward a light source and a retroreflective article have been well known so far and the sheeting using the retroreflectivity is widely used in the above utilization field. Particularly, a retroreflective article such as a triangular-pyramidal cube-corner retroreflective sheeting using the retroreflective principle of a cube-corner retroreflective element is remarkably superior in retroreflective efficiency of light to a retroreflective article such as a conventional retroreflective sheeting using micro glass beads and its purpose is expanded year by year.

A conventionally-known triangular-pyramidal retroreflective element shows a preferable retroreflective efficiency in accordance with its reflective principle when it has an equal distance from three reflective lateral faces intersecting at an angle of 90° each other and an angle formed of an optical axis passing through the apex of a triangular pyramid and an incoming ray is small. However, there is a disadvantage that the retroreflective efficiency is exponentially deteriorated as the angle increases. Moreover, there is a disadvantage that when an observer observes retroreflective light at a position separate from a light source, observed reflected light is weak.

Because of the above reasons, the conventionally-known triangular-pyramidal retroreflective element has a disadvantage that the retroreflective efficiency is exponentially deteriorated as the angle formed between a line vertical to the reference surface of a retroreflective article and incoming ray or an incident angle increases. This is caused by the fact that because ray is incoming to a reflective lateral face at angle smaller than a critical angle satisfying an internal total-reflective condition decided by the ratio between the refractive index of a transparent medium constituting a triangular-pyramidal reflective element and that of air and thereby, the ray passes through the back of a retroreflective element without internally totally reflecting on the reflective lateral face. Thereby, a retroreflective article using a triangular-pyramidal reflective element is inferior in retroreflective characteristic at a large incoming angle even if it is generally superior in retroreflective characteristic in the front direction and has a disadvantage that it is inferior in the so-called incident angularity. Moreover, because the shape of the element is triangular, the element has a disadvantage that the retroreflective efficiency is greatly changed depending on a direction of the element from which light is incoming or a direction in which an observer is located (rotation angle).

Moreover, it is possible to obtain a superior reflective performance because a triangular-pyramidal retroreflective element uses a comparatively large element compared with micro glass beads reflective element and thereby, spread of reflected light by diffraction effect is small and reflected light is not extremely diverged due to spherical aberration differently from the case of micro glass beads reflective element.

However, divergence of reflected light having an extremely narrow retroreflective light easily causes a practical disadvantage that when the light emitted from the head lamp of a vehicle is retroreflected from a traffic sign, retroreflective light is concentrically returned to the head lamp and it does not easily reach eyes of a driver who is present at a position separate from its incident-light axis. This disadvantage is particularly remarkable because an angle (observation angle) formed between the incident-light axis of a ray and an axis connecting a driver and a reflective point (observation axis) increases. Thus, a retroreflective article using a conventionally-known triangular-pyramidal retroreflective element has a disadvantage that it is inferior in observation angularity.

For improvement of incident angularity or observation angularity of the cube-corner retroreflective sheeting and retroreflective article, particularly triangular-pyramidal cube-corner retroreflective sheeting and retroreflective article, many proposals have been known from a long time ago and various improvements and studies are made.

For example, U.S. Pat. No. 2,310,790 of Jungersen describes setting retroreflective elements having various shapes on a thin sheeting. In the case of triangular-pyramidal reflective elements shown in this US patent, a triangular-pyramidal reflective element whose apex is located at the center of a bottom-plane triangle, whose optical axis is not tilted and whose bottom shape is an equilateral triangle and a triangular-pyramidal reflective element whose apex position is not located at the center of the bottom-plane triangle and whose bottom-plane shape is isosceles triangular are shown and it is described that light is efficiently reflected on an approaching vehicle (improvement of incident angularity).

Moreover, it is described that the size of a triangular-pyramidal reflective element is kept within 1/10 inch (2,540 μm) as the depth of the element. Furthermore, in FIG. 15 of this US patent, a triangular-pyramidal reflective element pair is illustrated whose optical axis is tilted in the direction in which the optical axis becomes plus (+) as to be described later. When obtaining the tilt angle (θ) of the optical axis from the ratio between lengths of the long side and the short side of the bottom-plane isosceles triangle of the illustrated triangular-pyramidal reflective element, it is estimated that the tilt angle is approx. 6.5°.

However, the above US patent of Jungersen does not specifically disclose a very-small triangular-pyramidal reflective element to be described later in order to provide superior observation angularity or incident angularity. Moreover, proper size and proper optical-axis tilt of a triangular-pyramidal reflective element are not described or suggested.

Furthermore, in U.S. Pat. No. 3,712,706 of Stamm describes a retroreflective sheeting in which the so-called equilateral-triangular-pyramidal cube-corner retroreflective elements are arranged on a thin sheeting so that base lines of the elements whose shapes of base lines are equilateral triangular become closest-packed state and a retroreflective article are described. The US patent of Stamm improves the problem of deterioration of retroreflective efficiency and the disadvantage that retroreflection does not occur because the light incoming at an angle of less than internal total-reflective condition passes through the interface of the element by vacuum-evaporating the reflective lateral face of a reflective element by, for example, metal such as aluminum, mirror-reflecting incoming light, and increasing an incident angle.

However, in the case of the above proposal of Stamm, a mirror layer is set on the reflective lateral face as means for improving wide angularity. Therefore, disadvantage that the reflection performance is deteriorated easily occurs because the appearances of an obtained retroreflective sheeting and retroreflective article become dark or metal such as aluminum or silver used for a mirror-layer is oxidized due to entrance of water or air during use. Moreover, means for improving wide angularity by the tilt of an optical axis is not described at all.

Furthermore, European Patent No. 137,736B1 of Hoopman describes a retroreflective sheeting in which a pair of tilted triangular-pyramidal cube-corner retroreflective elements each of whose bottom shape is an isosceles triangle are arranged on a thin sheeting by rotating by 180° from each other and their base lines are arranged on a common plane like a closest-packed state and a retroreflective article. It is shown that the optical axis of the triangular-pyramidal cube-corner retroreflective element described in this patent tilts in the minus (−) direction described in this specification and the tilt angle approximately ranges between 7 and 13°.

Furthermore, U.S. Pat. No. 5,138,488 of Szczech similarly discloses retroreflective sheetings arranged so that tilted triangular-pyramidal cube-corner retroreflective elements each of whose base line shape is an isosceles triangle are arranged on a thin sheeting so that base lines of them become closest-packed state on a common plane and a retroreflective article. In the case of this US patent, it is specified that the optical axis of the triangular-pyramidal reflective element tilts in the direction of a side shared by two paired triangular-pyramidal reflective elements faced each other, that is, in the plus (+) direction to be described later, its tilt angle ranges between 2 and 5°, and the size of the element ranges between 25 and 100 μm.

European Patent No. 548,280B1 corresponding to the above patent describes the tilt is such that for each elements in the pair of elements the distance between its apex and a plane which contains the common side of the pair of element and is perpendicular to the base plane, is not equal to the distance between said plane and the point of intersection between the optical axis and the base plane, the tilt angle ranging between about 2 and 5°, and the size of an element ranges between 25 and 100 μm.

As described above, in the case of European Patent No. 548,280B1 of Szczech, the tilt of the optical axis ranges between 2 and 5° including both plus (+) state and minus (−) state. However, only the triangular-pyramidal reflective elements having tilt angles of the optical axes of (−)8.2°, (−)9.2°, and (−)4.3° and element height (h) of 87.5 μm are disclosed in examples of the above US patent of Szczech and European Patent.

In the case of retroreflective elements shown in the above four patents, the three-directional V-shaped grooves for forming elements show the symmetric figure shown in FIG. 7(a) for explaining the present invention and retroreflective elements to be formed are obtained as a pair of symmetrical triangular-pyramidal cube-corner element pairs shown in FIGS. 5 and 6. However, in the case of these inventions, observation angularity is not improved though incident angularity is improved.

Moreover, as a proposal for improving observation angularity, in the case of U.S. Pat. No. 4,775,219 of Appeldorn, a V-shaped groove for forming an element shows an asymmetrical figure shown in FIG. 7(b) for describing the present invention and has a slight deviation for the theoretical angle of a V-shaped groove for forming a cube corner. Moreover, improvement of observation angularity is attempted by periodically changing a deviation for providing asymmetry with adjacent V-shaped grooves.

However, periodically changing angles of adjacent V-shaped grooves increases the difficulty of molding. Even if the difficulty can be conquered, uniform spread of reflected light cannot be made because combinations of deviations which can be provided are finite. Moreover, it is necessary to prepare a plurality of working tools such as diamond bites for one V-shaped groove direction. Furthermore, accurate working technique is necessary to asymmetrically form a V-shaped groove.

Furthermore, U.S. Pat. No. 5,171,624 of Walter discloses a triangular-pyramidal retroreflective element in which a reflective lateral face having a certain quadric-surface sectional shape is formed by using a working tool having the curved sectional shape shown in FIG. 7(c) for explaining the present invention. In the case of the triangular-pyramidal retroreflective element in which the reflective lateral face having a certain quadric surface is formed, proper retroreflective light can be diverged and observation angularity is improved.

However, it is very difficult to form a purposed shape by the working tool having the curved-sectional shape. Therefore, it is very difficult to obtain a quadric surface based on purposed design because of the difficulty of tool working. Moreover, it is impossible to form various-shaped quadric surfaces decided by only the shape of a working tool to be used on the same retroreflective article.

In the case of U.S. Pat. No. 5,565,151 of Nilsen, it is attempted to improve observation angularity by cutting off a part of reflective lateral face (A-B-H) shown in FIG. 8 for explaining the present invention and prompting divergence of retroreflective light by a triangular-pyramidal shape (A-A1-A2-B2-B1-B) formed of the part of the reflective lateral face and a new reflective lateral face (A2-H1-B2).

However, in the case of the invention of Nilsen, the following are not specifically described: setting of what triangular-pyramidal shape is preferable or at what angle a new reflective lateral face is formed is preferable. Moreover, a special tool for cutting off a part of a reflective lateral face and forming the portion of a triangular-pyramidal shape is necessary. Furthermore, a newly-formed triangular-pyramidal-shape element does not have a retroreflective function but it attempts to obtain the spread of retroreflective light by merely dispersing light in various directions.

As described above, conventionally-known triangular-pyramidal cube-corner retroreflective elements of U.S. Pat. No. 2,310,790 of Jungersen, U.S. Pat. No. 3,712,706 of Stamm, European Patent No. 137,736B1 of Hoopman, U.S. Pat. No. 5,138,488 and European Patent No. 548,280B1 of Szczech are common as shown in FIG. 6 in that bottom planes of many triangular-pyramidal reflective elements respectively serving as the nucleus of incidence and reflection of light are present on the same plane, a pair of faced elements forms a similar figure, and heights of the elements are equal, a retroreflective sheeting constituted of triangular-pyramidal reflective elements whose bottom planes are present on the same plane and retroreflective article are inferior in incident angularity, that is, they respectively have a disadvantage that the retroreflective performance is suddenly decreased when the incident angle of light to the triangular-pyramidal reflective element is increased.

Moreover, improvement of observation angularity by various techniques is proposed in the above-described conventionally-known U.S. Pat. No. 4,775,219 of Appeldorn, U.S. Pat. No. 5,171,624 of Walter, and U.S. Pat. No. 5,565,151 of Nilsen. However, any one of these inventions has a disadvantage that it is difficult to prepare a tool and perform die molding.

DISCLOSURE OF THE INVENTION

As a basic optical characteristic generally desired for a triangular-pyramidal cube-corner retroreflective sheeting and retroreflective article, the reflection performance (front reflection performance) of light incoming from the front direction of a reflection object, light source, and reflection performance (wide angularity) in various geometric positional relations of an reflection object and observer are requested. Moreover, three performances of observation angularity, incident angularity, and rotation angularity are generally requested for the wide angularity.

An object of the present invention does not depend on the above conventionally-known method but it lies in the fact of improving three angularities, particularly observation angularity by a simple method by using a retroreflective article formed of many triangular-pyramidal cube-corner retroreflective element pairs formed of parallel V-shaped groove groups (x, x, x, . . . , y, y, y . . . , and z, z, z, . . . ) from x direction, y direction, and z direction and set on the common plane (S-S') decided by the bottom-plane groups of the parallel V-shaped groove groups and forming a retroreflective article formed of many triangular-pyramidal cc retroreflective element pairs characterized in that one-side groove angle (GLx, GRx, GLy, GRy, GLz, or GRz) formed between a cross line between a plane vertical to the common plane (S-S') and a V-groove vertical plane (Svx, Svy, or Svz) which includes the base line of a V-shaped groove and perpendicular to said the common plane (S-S'), and a reflective lateral face (a1, b1, c1, a2, b2, or c2), and the V-groove vertical plane does not form a constant angle in the reflective lateral face but the reflective lateral face forms a curved and/or multiple surface.

Moreover, a normal reflective lateral face of the present invention denotes a reflective lateral face in the relation of a theoretical cube-corner reflective lateral face. Furthermore, a normal one-side groove angle denotes a groove angle required to form a normal retroreflective element.

Another object of the present invention lies in the fact of selectively improving a retroreflective performance at a purposed observation angle by forming many triangular-pyramidal cube-corner retroreflective element pairs characterized in that in a reflective lateral face having at least one-directional V-shaped groove (x, y, or z) as its bottom plane, the one-side groove angle (GLx, GRx, GLy, GRy, GLz, or GRz) does not form a constant angle with the maximum deviation between 0.0001 and 0.1° but the reflective lateral face forms a curved and/or multiple surface.

According to the present invention, in a retroreflective article formed of many triangular-pyramidal cube-corner retroreflective element pairs formed of parallel V-shaped groove groups (x, x, x . . . , y, y, y . . . , and z, z, z . . . ) from three directions of x direction, y direction, and z direction and set on the common plane (S-S') decided by base line groups of the parallel V-shaped groove groups, the above object is achieved by providing a retroreflective article formed of many triangular-pyramidal cube-corner retroreflective element pairs characterized in that one-side groove angle (GLx, GRx, GLy, GRy, GLz, or GRz) formed between a cross line between a plane vertical to the common plane (S-S') and a V-groove vertical plane (Svx, Svy, or Svz) which includes the base line of a V-shaped groove and perpendicular to the common plane (S-S'), and a reflective lateral face (a1, b1, c1, a2, b2, or c2), and the V-groove vertical plane does not form a constant angle in the reflective lateral face but the reflective lateral face does not form a plane.

Furthermore, in a retroreflective article formed of many triangular-pyramidal cube-corner retroreflective element pairs formed of V-shaped groove groups (x, x, x, . . . , y, y, y . . . , and z, z, z . . . arranged at equal intervals from three directions and set on the common plane (S-S') decided by base line groups of the V-shaped groove groups not depending on the above conventionally-known method, another object of the present invention lies in the fact of improving three angularities, particularly observation angularity by a simple method by forming a retroreflective article formed of many triangular-pyramidal cube-corner retroreflective element pairs characterized in that the base line constituting a V-shaped groove in any direction in the retroreflective element pairs is nonlinear base line which does not form a linear trajectory and a reflective lateral face formed of the V-shaped groove forms a curved and/or multiple surface.

Still another object of the present invention lies in the fact of selectively improving the retroreflective performance at a purposed observation angle by using a retroreflective article formed of many triangular-pyramidal cube-corner retroreflective element pairs characterized in that a nonlinear factor (fx, fy, or fz) specified by the maximum distance between the intersect of the vertical line from the both-end straight line connecting the both ends of the nonlinear both side to the nonlinear base line and the both-end straight line ranges between 0.0001 L and 0.05 L when assuming the length of the both-end straight line as L.

A normal reflective lateral face of the present invention denotes a reflective lateral face in the relation of a theoretical cube-corner reflective lateral face in which three reflective lateral faces of a cube-corner retroreflective element are substantially vertical to each other. Moreover, a normal one-side groove angle denotes a one-side groove angle of a V-shaped groove required to form a normal retroreflective element. Furthermore, a nonlinear base line denotes that a base line forming a reflective lateral face does not form a linear trajectory. A reflective lateral face having the above base line does not form a plane but it forms any one of a quadric surface, tertiary surface, multi-plane reflective lateral face formed of combination of quadric surface and tertiary surface, or multi-plane reflective lateral face formed of combination of a plurality of planes.

Moreover, an optical axis of the present invention is generally well known as the central axis of three normal reflective lateral faces and described in the above inventions of Hoopman and Szczech. Incident light has a property in which the retroreflective performance becomes highest when the incident light enters an optical axis in parallel and is used as a target of the incident angularity of a reflective element.

The tilt angle of an optical axis is defined as an angle formed between the optical axis and a vertical line extended from the apex of an element to the common plane (S-S'). It is possible to improve the retroreflective performance for a large incident angle by tilting an optical axis. In this case, however, the bottom-plane shape of a reflective element does not becomes an equilateral triangle. Therefore, three internal angles of a triangle at the bottom plane are univocally decided in accordance with the tilt angle and tilt direction of the optical axis.

Also, a retroreflective element of the present invention having a not-normal reflective lateral face has a pseudo optical axis corresponding to an optical axis. The pseudo optical axis is an axis having the tilt angle and direction same as those of the optical axis of a normal retroreflective element having a normal reflective lateral face decided by a bottom-plane triangle formed of the both-end straight line connecting the both ends of the nonlinear base line of the reflective element and other linear base line, which is useful at a target of the incident angularity of an element of the present invention.

According to the present invention, in a retroreflective article formed of many triangular-pyramidal cube-corner retroreflective element pairs formed of V-shaped groove groups (x, x, x, . . . , y, y, y, . . . , and z, z, z, . . . ) arranged at equal intervals from three directions and set on the common plane (S-S') decided by the base line groups of the V-shaped groove groups, observation angularity which is a problem of the present invention is improved by using a retroreflective article formed of many triangular-pyramidal cube-corner retroreflective element pairs characterized in that the base line constituting any-directional V-shaped groove is a nonlinear base line which does not form a linear trajectory and forms a curved and/or multiple surface.

Moreover, incident angularity is improved by setting an internal angle of the bottom-plane triangle formed of the both-end straight line connecting the both ends of three reflective lateral faces constituting the retroreflective element pair to 35-75°, preferably 45-70°.

Furthermore, the incident angularity is further improved by making the depth of the plane (Sx, Sy, or Sz) formed of the base line groups of the V-shaped groove groups (x, x, x, . . . , y, y, y, . . . , and z, z, z . . . in at least one direction constituting the above retroreflective element pair different from the depth of other planes.

In the case of a retroreflective article formed of many triangular-pyramidal cube-corner retroreflective element pairs formed of parallel V-shaped groove groups (x, x, x, . . . , y, y, y, . . . , and z, z, z . . . ) from three directions of x direction, y direction, and z direction and set on the common plane (S-S') decided by base line groups of the parallel V-shaped groove groups, improvement of three angularities, particularly improvement of observation angularity is achieved by forming a retroreflective article formed of many triangular-pyramidal cube-corner retroreflective element pairs characterized in that one-side groove angle (GLx, GRx, GLy, GRy, GLz, or GRz) formed between a cross line between a plane vertical to the common plane (S-S') and a V-groove vertical plane (Svx, Svy, or Svz) which includes the base line of a V-shaped groove and perpendicular to said the common plane (S-S'), and a reflective lateral face (a1, b1, c1, a2, b2, or c2), and the V-groove vertical plane does not form a constant angle in the reflective lateral face but the reflective lateral face forms a curved and/or multiple surface.

A retroreflective article of the present invention by triangular-pyramidal cube-corner retroreflective element pairs can easily control the spread of retroreflective light in a purposed range and achieve improvement of observation angularity which has been difficult so far. Moreover, by selectively providing a deviation for a one-side groove angle, it is possible to provide the spread of retroreflective light in a specified direction. Therefore, it is possible to selectively improve observation angularity in a certain direction, for example, a direction where a driver is present.

Furthermore, in the case of a retroreflective article formed of many triangular-pyramidal cube-corner retroreflective element pairs formed of V-shaped groove groups (x, x, x, . . . , y, y, y . . . , and z, z, z . . . ) arranged at equal intervals from three directions and set on the common plane (S-S') decided by base line groups of the V-shaped groove groups without depending on the above conventionally-known method, an advantage of the present invention lies in the fact of achieving improvement of three angularities, particularly observation angularity by a simple method by forming a retroreflective article formed of many triangular-pyramidal cube-corner retroreflective element pairs characterized in that a base line constituting any-directional V-shaped groove is a nonlinear base line which does not form a linear trajectory and the reflective lateral face formed of the V-shaped groove forms a curved and/or multiple surface.

BEST MODE FOR CARRYING OUT THE INVENTION

It is most preferable to apply a machining method referred to as a ruling method or shaper method which cuts out a workpiece while pressing a diamond tool having a V-shaped front-end shape against the workpiece to the workpiece used to form a triangular-pyramidal cube-corner retroreflective element pairs constituting a retroreflective article of the present invention.

Figure 1:
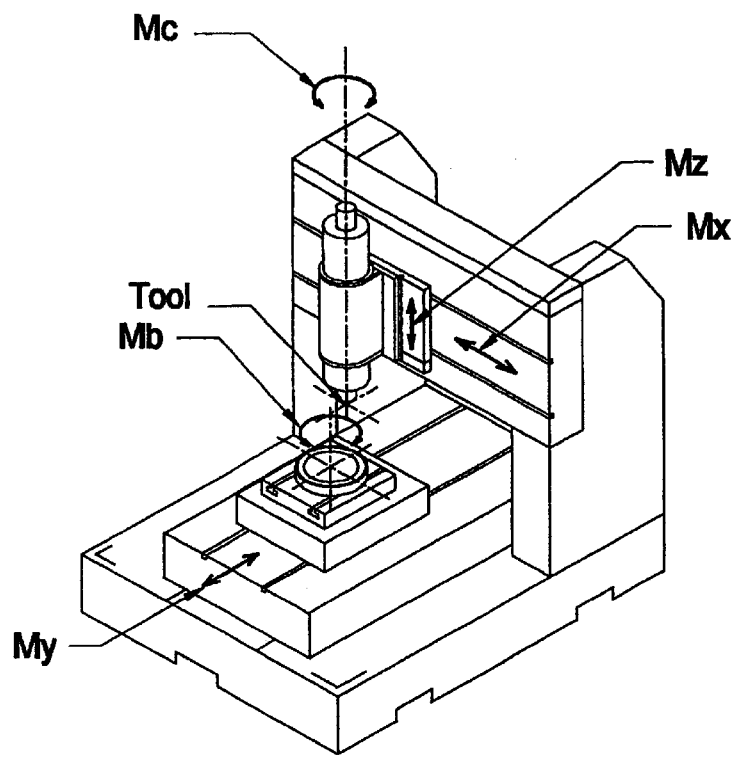
FIG. 1 is an illustration showing a working machine used to form a retroreflective element.

FIG. 1 shows a shaper working machine used to form a triangular-pyramidal retroreflective element pair group of the present invention. This working machine is constituted of a rotary table (Mb axis) set on a two-directional slide table shown as Mx axis and My axis in FIG. 1 and a diamond tool set to the bottom end of another rotary table set on the above rotary table (Mb axis). A V-shaped groove is formed by fixing the workpiece on the rotary table and pressing the diamond tool against the workpiece at a certain force, and moving the workpiece along the Mx axis or My axis and thereby drawing an optional trajectory. In this case, by controlling the position of the Mz axis, it is possible to slightly change the depth of the V-shaped groove. Moreover, to form a V-shaped groove of the present invention, it is possible to continuously change the angle of the V-shaped groove in one V-shaped groove by slightly rotating the Mc axis and thereby changing the projective shape of a tool having a V-shaped front-end shape.

In the case of the shaper working, it is necessary to perform grooving several times so that a predetermined depth is obtained by setting the one-time working depth to 1 to 10 μm. By moving a workpiece along the Mx axis and My axis during this working, not only a straight line but also a V-shaped groove are formed by drawing an optional trajectory. Thereby, a retroreflective element can be formed which has a nonlinear base line constituting an any-directional V-shaped groove whose base line does not form a linear trajectory but form a nonlinear base line in a retroreflective element pair of the present invention, which does not form a linear trajectory.

As a tool for forming a retroreflective element of the present invention, it is possible to use any one of diamond, sapphire, and various cutting alloys. Among them, diamond is particularly superior in abrasion resistance and preferable because of keeping the angle of a V-shaped groove constant during working. Moreover, to prevent the angle of the V-shaped groove from being changed due to abrasion, it is allowed to separate preparative cutting up to a predetermined depth from finish cutting up to a purposed depth by using two working tools.

Also in the case of a working method referred to as a conventionally-known so-called fly cutting method, it is possible to execute the V-shaped-groove working method. By changing the setting angle of a diamond tool and thereby changing the projective shape of the tool, it is possible to slightly change the angle of a V-shaped groove. The fly cutting method has an advantage that a desired groove depth can be formed by one-time cutting. However, though the fly cutting method is suited to draw a linear trajectory, the method is not suited to accurately form an optional nonlinear trajectory. Moreover, the method cannot change the angle of a V-shaped groove in one V-shaped groove by changing a tool setting angle during working.

FIG. 2(a) shows a diamond tool used to form a triangular-pyramidal retroreflective element of the present invention. Diamond having a V-shaped front-end shape shown in the enlarged view (b) is set to the front end of the tool and the projective shape of the diamond is reflected on the shape and angle of a V-shaped groove. Moreover, FIGS. 3(a) to 3(d) explain how the V-shaped groove to be formed can be changed by variously changing the setting angle of the diamond tool and thereby changing the projective shape of the V-shaped front end.

Figure 3:
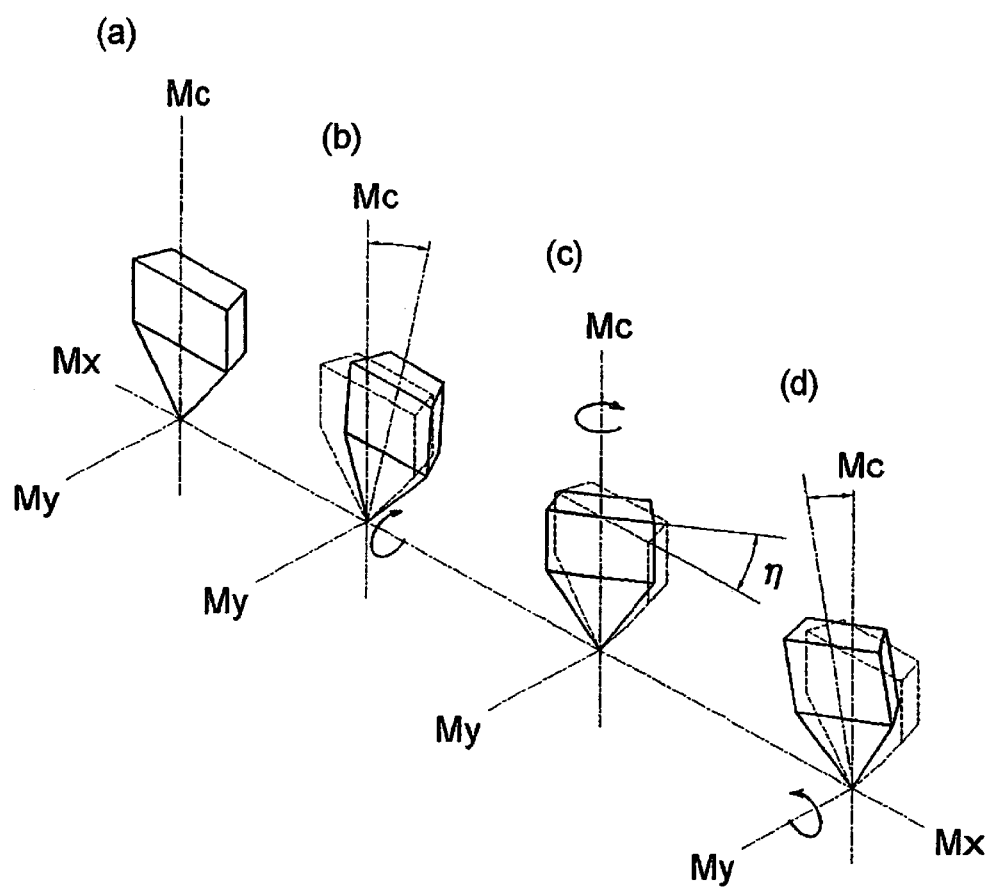
FIG. 3 is an illustration showing a setting method of a working tool used to form a retroreflective element.

In FIG. 3(a), symmetric V-shaped diamond is vertically set to a working reference plane at a symmetric position by a standard setting method. It is possible to rotate this working tool in three directions by the above-described three-directional working axes.

FIG. 3(b) shows that it is possible to decrease the angle of a V-shaped groove by slightly tilting a tool through rotation along the Mx axis centering around the front end of the working tool. This change is achieved by changing the setting angle of a normal tool in the vertical direction (Mc axis).

Moreover, FIG. 3(c) shows that the angle of a V-shaped groove can be slightly decreased by slightly rotating a working tool through rotation (angle: η) along the Mc axis centering around the front end of the working tool and changing the projective shape. This angle change can be performed by rotating the Mc axis while forming a V-shaped groove. The sectional shape of the V-shaped groove formed by this method does not have a constant angle.

The relation between the slewing angle (η) of this cutting tool shown in FIG. 3(c) and the projective angle (coinciding with the sum of one-side groove angles at both sides and referred to as both-side groove angle (2G')) can be shown by the following Expression 1.

$$2G' = 2 \tan^{-1}(\tan G \cdot \cos \eta)$$  Expression 1

In expression 1, G denotes the one-side groove angle at the front end of a working tool which does not rotate, η denotes the slewing angle of the tool shown in FIG. 3(c), and G' denotes the projective one-side groove angle of the rotated tool.

Figure 2:
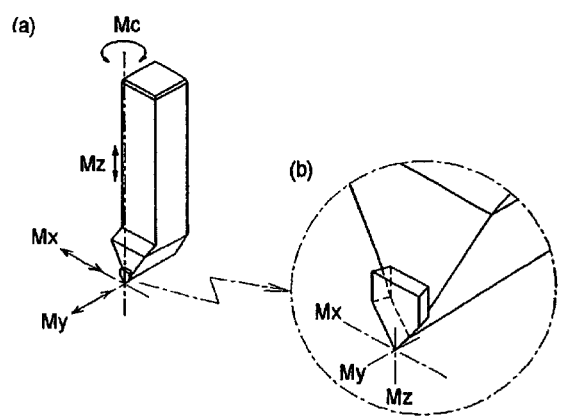
FIG. 2 is an illustration showing a working tool used to form a retroreflective element.

Specifically, the one-side groove angle at the front end of a working tool required to form a triangular-pyramidal cube-corner retroreflective element having no normal optical-axis tilt is 35.2640°. However, the projective angle G' when rotating the tool by η=1° is 35.2599°, the projective angle G' when rotating the tool by η=2° is 35.2475°, and the projective angle of 34.8516° is obtained when rotating the tool by η=10°. This minute change of angles far-outruns the manufacturing accuracy of a working tool. However, as shown in FIG. 2, an excessive slewing angle is not preferable because of the restriction due to the thickness of the working tool and the rake angle of working front end.

Moreover, the method shown in FIG. 3(d) can asymmetrically change a V-shaped groove by slightly tilting a working tool to right or left in the direction along the My axis centering around the front end of a working tool. Though this asymmetric V-shaped groove can be simultaneously formed at right and left by using a symmetric V-shaped tool, it is also allowed to form the groove one side by one side by using a horizontally asymmetric tool. This method is particularly useful when forming an asymmetric V-shaped groove.

Figure 4:
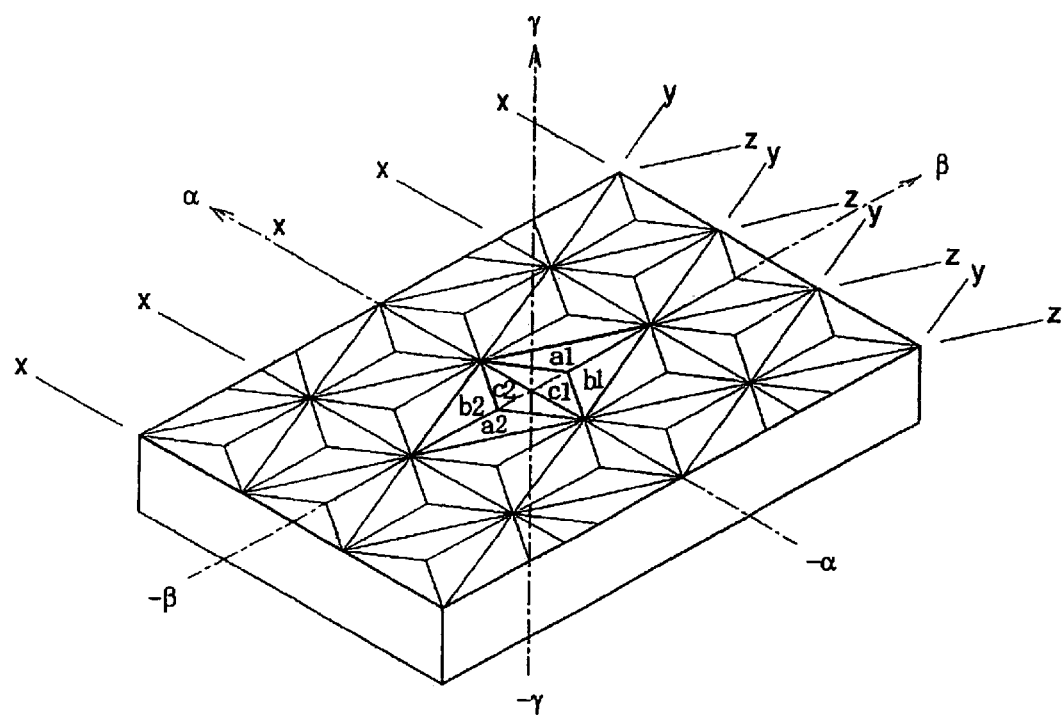
FIG. 4 is an illustration for explaining a working method used to form a retroreflective element.

FIG. 4 shows the principle for forming the above-described conventionally-known triangular-pyramidal cube-corner retroreflective element groups. Formation of these element groups is achieved by forming a workpiece set on a α-β plane defined by α-β-γaxis (on rotary table of working machine) by substantially-symmetric parallel V-shaped groove groups from three directions (x, y, and z directions) on α-β plane. In the case of a general retroreflective element, three-directional V-shaped grooves are formed so as to intersect each other at one point. As a result, the triangular-pyramidal cube-corner retroreflective elements shown in FIGS. 5 and 6 are formed as a pair on the common plane (S-S') parallel with α-β plane decided by base line groups of the parallel V-shaped groups in a closest-packed state so as to share the base lines with base lines of adjacent elements.

Figure 5:
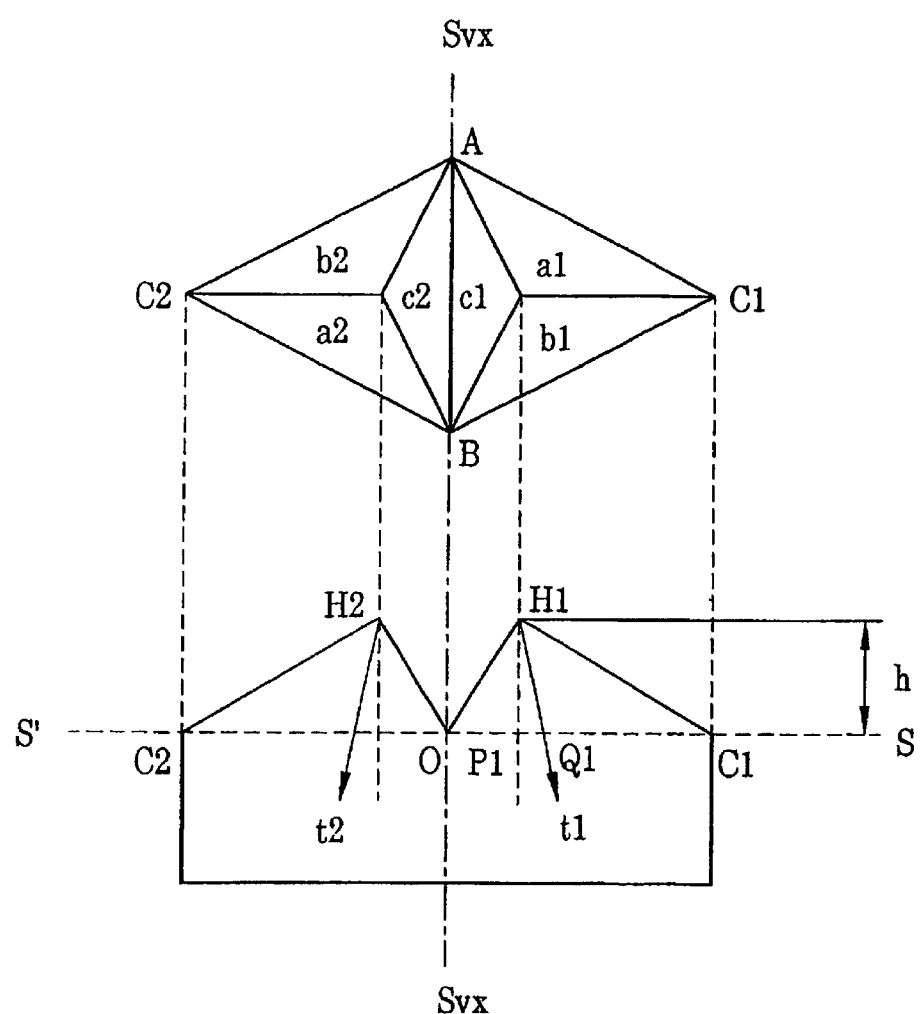
FIG. 5 is an illustration showing a retroreflective element pair according to prior art.

The size of a conventionally-known retroreflective element whose base line is an isosceles triangle shown in FIG. 5 is represented as the height (h) of the element and the height of the element is decided in accordance with the interval between three-directional parallel groove groups. Moreover, the tilt angle of an optical axis decided as the central axis of three reflective lateral faces vertical to each other is univocally decided in accordance with the shape of a bottom-plane triangle, that is, an angle where three-directional V-shaped grooves intersect. In the case of the intersection angle of a retroreflective element having no tile of optical axis of retroreflective elements each of whose base line is an isosceles triangle, the x-y-directional intersection angle of ∠A-B-C1, y-z-directional intersection angle of ∠A-C1-B, and x-z-directional intersection angle of ∠B-A-C1 are 60°. Moreover, when the optical axis of a retroreflective element whose base line is an isosceles triangle tilts in plus direction, the y-z intersection angle ∠A-C1-B is smaller than 60° and when the optical axis tilts in minus direction, the y-z intersection angle ∠A-C1-B is larger than 60°.

In a tilt element in which the tilt angle of an optical axis is plus or minus, an element whose optical axis tilts so that (q-p) becomes plus is referred to as a plus tilt element when assuming the distance between a point (P1) where a vertical line extended from an apex H1 intersects with the common plane (S-') and the middle point (O) of a common base line (A-B) as p and the distance between a point (Q1) where an optical axis intersects with the common plane (S-S') intersect and the middle point (O) as q and an element whose optical axis tilts so that (q-p) becomes minus is referred to as a minus tilt element as shown in FIG. 5. Moreover, in the case of a normal element whose optical axis does not tilt, the point P1 and the point Q1 are present at the same position and (q-p) is zero (see FIG. 11(b)).

Figure 6:
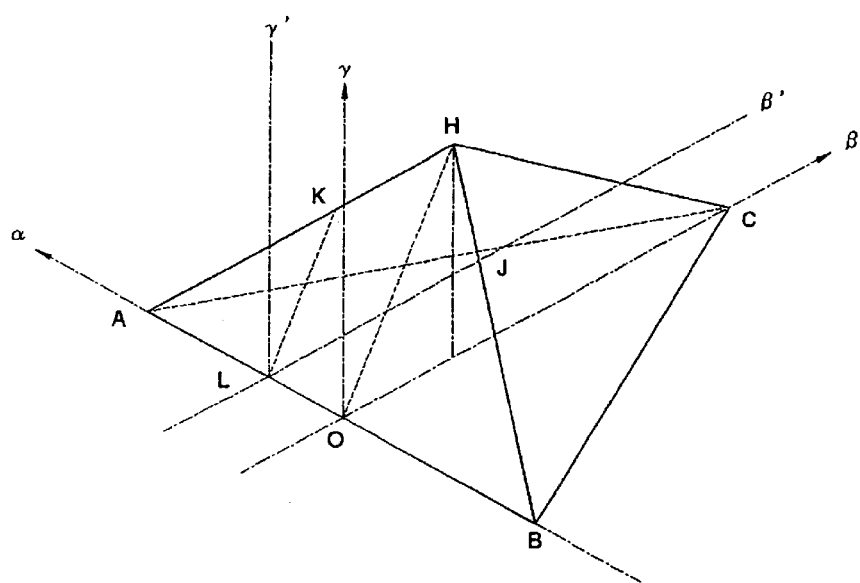
FIG. 6 is a perspective view of a retroreflective element according to prior art.

In the perspective view of the conventionally-know triangular-pyramidal cube-corner retroreflective element shown in FIG. 6, three reflective lateral faces of a plane (A-C-H), b plane (B-C-H), and c plane (A-B-H) are present on the base line (A-B-C) decided by three base lines (A-B, B-C, and C-A) present on the common plane (S-S'). Moreover, these three reflective lateral faces are flat surfaces and formed so as to be vertical to each other.

In FIG. 6, the bottom portion of the x-directional V-shaped groove coincides with α-axis direction and the V-groove vertical plane (Ux) contains the base line (A-B) on the α axis and is a plane vertical to the common plane (S-S'). A plane for defining a one-side groove angle which vertically intersects with the base line is a plane including points O-H-C at a point O and a plane including points L-K-J at a point L. Moreover, as shown in FIG. 6, in the case of the one-side groove angle of a V-shaped groove for forming an element, the one-side groove angle (shown by ∠γOH in FIG. 6) and the one-side groove angle (shown by ∠γLK in FIG. 6) are equal. Also, in y-directional and z-directional V-shaped grooves, similarly V-groove vertical planes (Uv and Uz) are defined as the planes which contain base lines (B-C and A-C) and are vertical to the common plane (S-S').

First Embodiment

A method for forming a retroreflective article of the present invention is more minutely described below by referring to the accompanying drawings.

Figure 9:
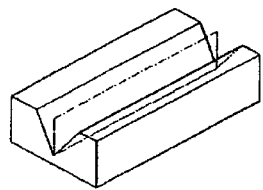
FIG. 9 is a sectional view of V-shaped grooves according to prior art.
Figure 9:
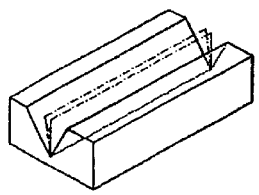
Figure 9:
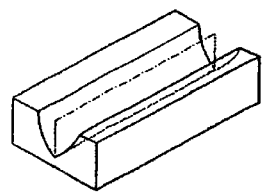

FIG. 9 shows a method for forming a V-shaped groove for forming many triangular-pyramidal cube-corner retroreflective element pairs in accordance with a conventionally-known method. FIG. 9(a) shows an illustration in which a horizontally-symmetric V-shaped groove is formed. A one-side groove angle (GL or GR in FIG. 7(b)) shown on the cross section of a formed V-shaped groove shows a constant angle in one V-shaped groove.

FIG. 9(b) shows an illustration in which a horizontally-asymmetric V-shaped groove is formed. The one-side groove angle (GL or GR in FIG. 7(b)) shown on the cross section of a formed V-shaped groove also shows a constant angle in one V-shaped groove.

FIG. 9(c) shows an illustration in which a groove whose cross section has a curved shape is shown. The one-side groove angle (GL or GR in FIG. 7(c)) shown on the cross section of a groove in which the formed cross section has a curved shape shows a constant shape in one V-shaped groove.

Figure 10:
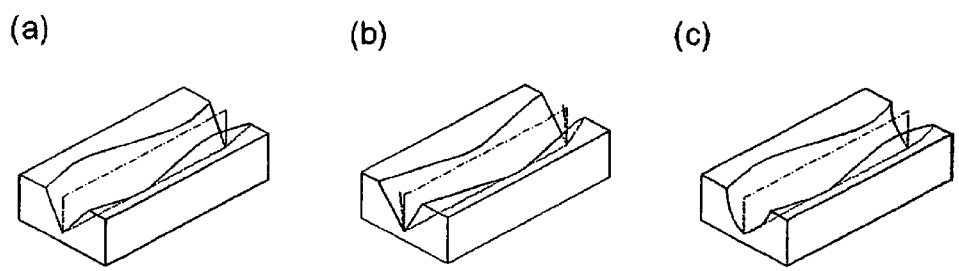
FIG. 10 is a sectional view of V-shaped grooves according to the first embodiment of the present invention.

FIG. 10 shows a method for forming V-shaped grooves used to form a retroreflective article formed of many triangular-pyramidal cube-corner retroreflective element pairs characterized in that one-side groove angle (GLx, GRx, GLy, GRy, GLz, or GRz) formed between a cross line between a plane vertical to the common plane (S-S') and also to a V-groove vertical plane (Svx, Svy, or Svz) which is vertical to the common plane (S-S') and contains the base line of the V-shaped groove, and a reflective lateral face (a1, b1, c1, a2, b2, or c2) containing the base line of the V-shaped groove, and the V-groove vertical plane does not form a constant angle in the reflective lateral face but the reflective lateral face forms a curved and/or multiple surface.

FIG. 10(a) shows a V-shaped groove in which a one-side groove angle (GL or GR) continuously changes in a horizontally-symmetric state (GL=GR), a one-side groove angle (GLx, GRx, GLy, GRy, GLz, or GRz) does not form a constant angle in the reflective lateral face, and the reflective lateral face forms a curved and/or multiple surface. A specific working method of the groove uses the method shown in FIG. 3(b) or 3(c), which is achieved by tilting or rotating a working tool while working a V-shaped groove and thereby continuously changing tool projective shapes.

FIG. 10(b) shows a V-shaped groove in which the one-side groove angle (GL or GR) continuously changes in a horizontally-asymmetric state, one-side groove angle (GLx, GRx, GLy, GRy, GLz, or GRz) does not form a constant angle in the reflective lateral face, and the reflective lateral face forms a curved and/or multiple surface. A specific working method of the groove uses the method shown in FIG. 3(d), which is achieved by tilting a working tool to right and left while working a V-shaped groove and thereby asymmetrically continuously changing tool projective shapes.

FIG. 10(c) shows a V-shaped groove in which the cross section has a curved shape is kept in a horizontally-symmetric state (GL=GR), one-side groove angle (GL or GR) (GLx, GRx, GLy, GRy, GLz, or GRz) continuously changes, a one-side groove angle (GLx, GRx, GLy, GRy, GLz, or GRx) does not form a constant angle in the reflective lateral face, and the reflective lateral face forms a curved and/or multiple surface. A specific working method of this groove is achieved by tilting or rotating a working tool whose cross section has a curved shape while working a V-shaped groove by the working tool and the method shown in FIG. 3(b) or 3(c) and thereby continuously changing tool projective shapes. Moreover, it is possible to form the horizontally-asymmetric groove shown in FIG. 10(b) by using a working tool whose cross section has a curved shape.

Figure 11:
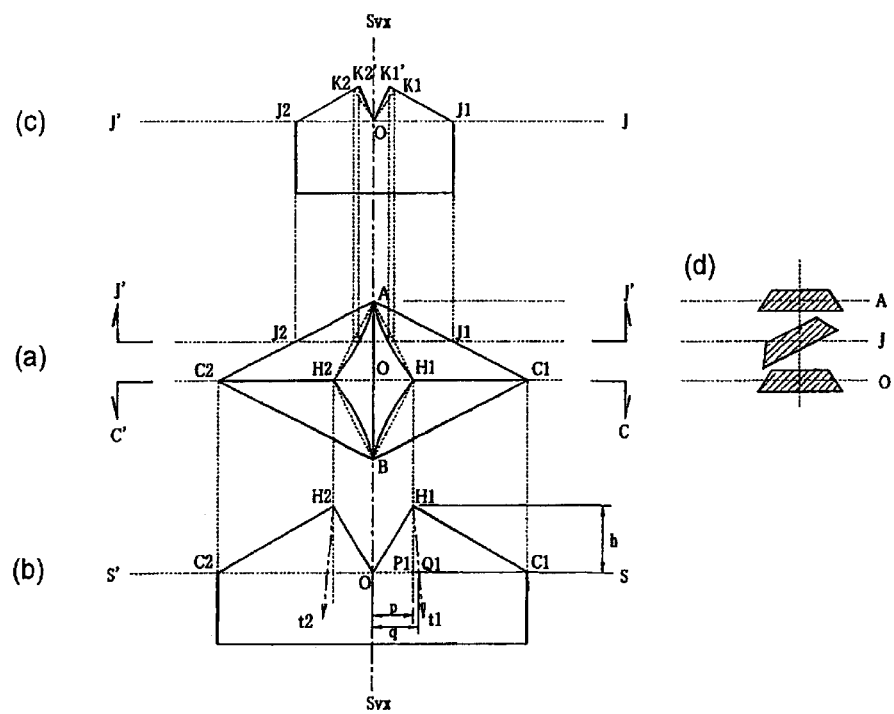
FIG. 11 is an illustration of retroreflective element pairs according to the first embodiment of the present invention.

A triangular-pyramidal cube-corner retroreflective element pair of the present invention is described below by referring to FIG. 11, which is prepared by forming a V-shaped groove in which a one-side groove angle (GL or GR) continuously changes, a one-side groove angle (GLx, GRx, GLy, GRy, GLz, or GRz) does not form a constant angle in the reflective lateral face, and the reflective lateral face forms a curved and/or multiple surface.

FIG. 11(a) shows a top view of a retroreflective element pair of the present invention. Two elements are set so that reflective lateral faces (A-B-H1 and A-B-H2) are faced each other by sharing the x-directional base line (A-B). Base lines (A-B-C1 and A-B-C2) of the two elements are present on the common plane (S-S').

FIG. 11(b) shows sectional shapes (O-C1-H1 and O-C2-H2) cut by the cutting line C-C' of the retroreflective element pair shown in FIG. 11(a). The cross section of the x-directional V-shaped groove is shown as H1-O—H2, the sectional shape is a horizontally-symmetric straight line, and its one-side groove angle is formed of a normal angle at which three reflective lateral faces are vertical to each other.

FIG. 11(c) shows sectional shapes (O-K1'-J1 and O-K2'-J2) cut out by the cutting line J-J' of the retroreflective element pair shown in FIG. 11(a). The cross section of the x-directional V-shaped groove is shown as K1'-O-K2, the cross section of the x-directional V-shaped groove is shown as K1'-O-K2, and the sectional shape is a horizontally-symmetric straight line. However, the shape (K1'-O-K2') of the V-shaped groove becomes small differently from a normal angle K1-O-K2 shown in FIG. 11(b).

FIG. 11(d) illustrates a method for rotating a working tool and changing the projective shape of the tool in order to form a V-shaped groove having an angle smaller than a normal angle shown in FIG. 11(c). At positions O and A, the working tool is not rotated and its projective shape has a normal angle at which three reflective lateral faces are vertical to each other. At a position J, a cutting tool is rotated from the Mc axis of a working machine and its projective shape becomes slightly smaller than a normal angle at which three reflective lateral faces are vertical to each other. As the cutting tool moves from the point A to point O in the top view FIG. 11(a), the working tool is continuously rotated from the Mc axis of the working machine and its projective shape continuously changes from a normal angle at which three reflective lateral faces are vertical to each other.

Therefore, though the reflective lateral faces (A-B-H1 and A-B-H2) faced each other becomes a curved surface without forming a plane but at any position, the cross section shows the shape of a linear V-shaped groove. The reflective lateral face having this curved surface does not retroreflect incident rays in parallel toward a light source. Therefore, because the reflective lateral face having the curved surface reflects at various reflection angles, it is possible to obtain a preferable observation characteristic because a divergent pattern in which retroreflected rays have uniform spread can be obtained.

Moreover, the sectional view 11(b) shows optical axes (t1 and t2). In the case of the present invention, however, because a part of a reflective lateral face does not have a planar shape, the optical axes shown here denote optical axes of a cube-corner retroreflective element formed of a reflective lateral face having a planar shape corresponding to a reflective lateral face not having a planar shape. However, because the deviation from the plane of a reflective lateral face not having the planar shape of a retroreflective element is very small, it is possible to approximately calculate incident angularity decided by an optical axis by the corresponding optical axis.

Hereafter, the plane c (A-B-H) is described.

Figure 12:
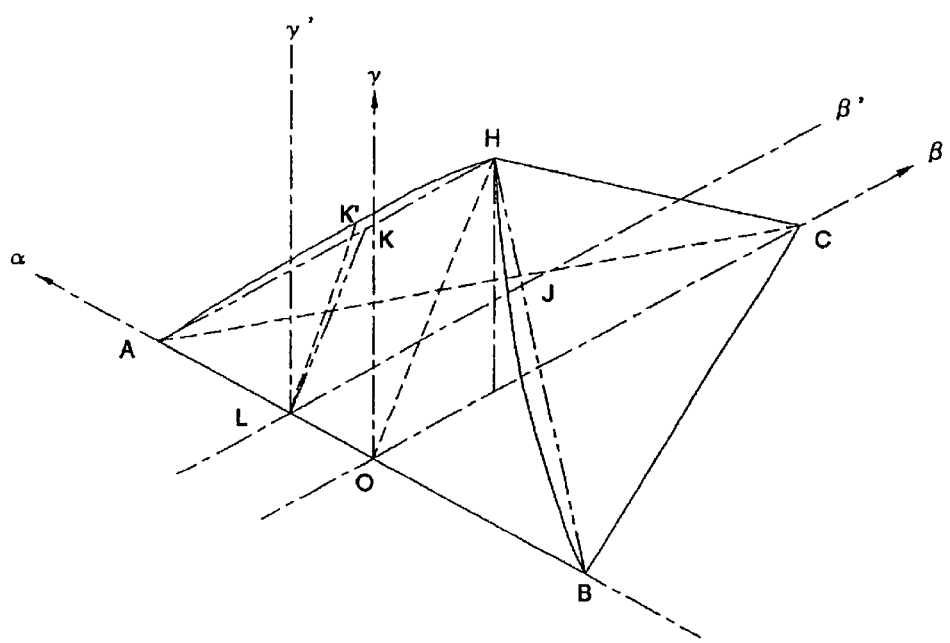
FIG. 12 is a perspective view of a retroreflective element according to the first embodiment of the present invention.

FIG. 12 shows a cubic diagram of a triangular-pyramidal cube-corner retroreflective element of the present invention. Two reflective lateral faces, plane a (A-C-H) and plane b (B-C-H) are present on a bottom plane (A-B-C) defined by three base lines (A-B, B-C, and C-A) present in the common plane (S-S') and these two reflective lateral faces are plane and are vertical to each other. Moreover, the remaining reflective lateral face, plane c (A-B-H) for forming an element is also present on the upper side of the common plane. In the case of a groove whose cross section is V-shaped for forming the plane c a one-side groove angle (shown by ∠γOH in FIG. 12) at the point O on the base line A-B is not equal to the one-side groove angle (shown by ∠γLK' in FIG. 12) at an optional point L and the angle continuously changes over the base line A-B. Therefore, the reflective lateral face, plane c (A-B-H), becomes a curved surface.

Figure 13:
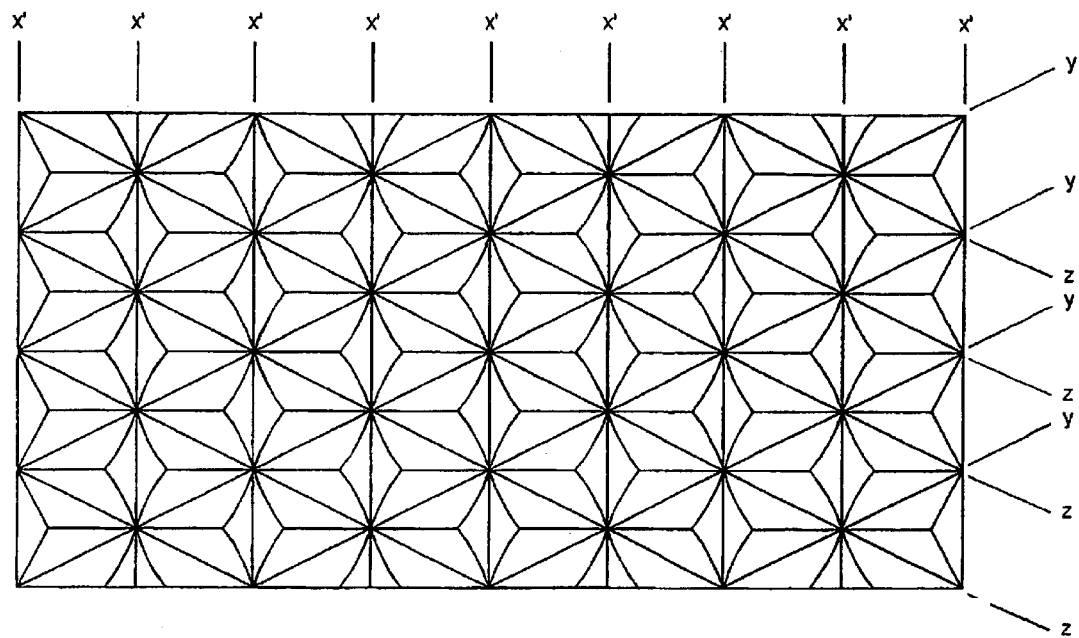
FIG. 13 is a collected top view of a retroreflective element group according to the first embodiment of the present invention.

FIG. 13 shows a top view of many triangular-pyramidal cube-corner retroreflective element pairs. The retroreflective element groups are formed of parallel V-shaped groove groups (x', x', x' . . . , y, y, y, . . . , and z, z, z, . . . ) from three directions of x direction, y direction, and z direction. In FIG. 13, x' denotes an x-directional V-shaped groove formed by rotating a working tool because a reflective lateral face is not a planar shape. In the case of this embodiment, only the x direction does not form a planar shape but y direction and z direction respectively have a planar reflective lateral face. However, it is also allowed to form any one of three-directional V-shaped grooves so that it does not form a planar shape.

Figure 14:
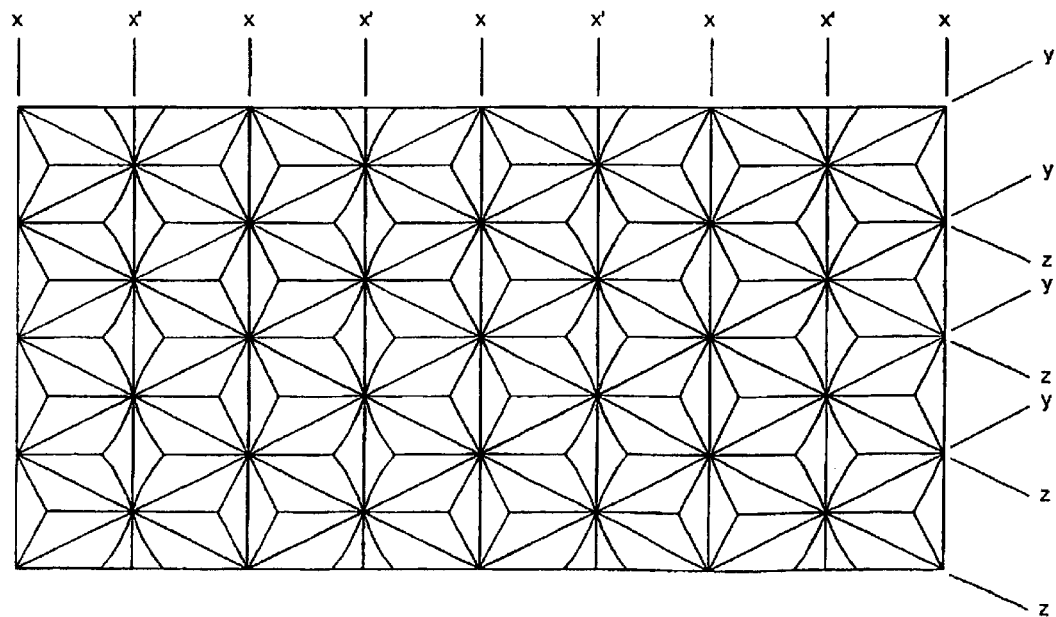
FIG. 14 is a collected top view of a retroreflective element group according to the first embodiment of the present invention.

FIG. 14 shows a top view of many triangular-pyramidal cube-corner retroreflective element pairs of another embodiment of the present invention. The retroreflective element groups are formed of parallel V-shaped groove groups (x', x, x', . . . , y, y, y, . . . , and z, z, z, . . . ) from three directions of x direction, y direction, and z direction and the x-directional V-shaped groove is formed so that a reflective lateral face does not form a planar shape every other lateral face. This retroreflective element can obtain a large retroreflective performance at a small observation angle.

Moreover, it is allowed to form x-directional, y-directional, and z-directional V-shaped grooves with a repetitive pattern by combining several types of V-shaped grooves having deviation patterns from several types of different planes by the same method. This combination is particularly preferable because uniform spread of retroreflective light is obtained.

It is particularly preferable that retroreflective element pairs constituting a retroreflective article of the present invention are many triangular-pyramidal cube-corner retroreflective element pairs characterized in that in the case of a reflective lateral face having at least one-directional V-shaped groove (x, y, or z) constituting the triangular-pyramidal cube-corner retroreflective element pairs as a base line, the one-side groove angle (GLx, GRx, GLy, GRy, GLz, or GRz) does not form a constant angle with the maximum deviation between 0.0001 and 0.1° from a normal one-side groove angle for forming a cube corner and the reflective lateral face forms a curved and/or multiple surface in order to uniform the retroreflective characteristic at various observation angles.

A similar art in the prior art can only provide a deviation of one-side groove angle or apex angle for one retroreflective element. Therefore, it is necessary to form a combination of several types of one-side groove angles and a very complicated working method must be used.

However, a method of the present invention for providing the deviation of a one-side groove angle can continuously change from the maximum deviation to an angle having no deviation from a normal one-side groove angle in one element. Therefore, the apex angle of a formed retroreflective element can be present as an element having from apex-angle deviation based on the maximum deviation up to a normal apex angle.

Moreover, there is an advantage that the allowable maximum deviation can be easily obtained by merely using the tool and thereby adjusting the slewing angle of a cutting tool. Specifically, it is possible to preferentially improve the retroreflective performance of a portion having a small observation angle by adjusting the change pattern of the slewing angle of a working tool for one element or over several adjacent elements, for example, widening the small range of a slewing angle. Moreover, it is possible to improve the retroreflective performance at a portion having a large observation angle by increasing the large range of a slewing angle.

It is preferable that the maximum deviation from an allowable normal one-side groove angle ranges between 0.0001 and 0.1°. When the maximum deviation is less than 0.0001°, divergence of light becomes extremely small and it is difficult to obtain the observation angularity. When the maximum deviation exceeds 0.1°, there are disadvantages that divergence of light becomes excessive and front-directional retroreflective characteristic is extremely deteriorated.

It is preferable that retroreflective element pairs constituting a retroreflective article of the present invention are many triangular-pyramidal cube-corner retroreflective element pairs characterized in that an angle (one-side groove angle: GLx, GRx, GLy, GRy, GLz, or GRz) formed between a vertical plane (V-groove vertical plane; Svx, Svy, or Svz) vertical to the common plane (S-S') and including the base line of a V-shaped groove and a line where a plane vertical to a V-shaped vertical plane and the common plane (S-S') intersect each other does not form a constant angle but a reflective lateral face forms a curved and/or multiple surface in three-directional V-shaped grooves constituting the triangular-pyramidal cube-corner retroreflective element pairs because it is possible to provide a uniform retroreflective pattern for incident lights from various directions.

However, it is also possible to selectively improve the observation angularity for a certain-directional azimuth. This is achieved by selectively providing a deviation for the one-side groove angle of a constant-directional V-shaped groove.

To improve both angularities such as observation angularity and incident angularity, in the case of a retroreflective article formed of many triangular-pyramidal cube-corner retroreflective element pairs formed of parallel V-shaped groove groups (x, x, x, . . . , y, y, y, . . . , and z, z, z, . . . ) from three directions (x, y, and z directions), it is preferable to use triangular-pyramidal cube-corner retroreflective element pairs in which one internal angle of a base line triangle formed of three base lines constituting a reflective element ranges between 35 and 75°, preferably ranges between 45 and 70°.

Use of a retroreflective element having a bottom-plane triangle of the above shape has a meaning substantially same as the fact of tilting the pseudo optical axis of the element.

A retroreflective element whose bottom plane is an isosceles triangle is described below as an example. When an angle (∠ACB) formed between equal-length sides ranges between 35 and 75°, the tilt of a corresponding pseudo optical axis ranges between approx. −15 and +180, and when other angles (∠ABC and ∠BAC) range between 35 and 75°, and the tilt of the corresponding pseudo optical axis corresponds to a change from −30° to +18°.

Moreover, to further improve both angularities such as observation angularity and incident angularity, in the case of a retroreflective article formed of many triangular-pyramidal cube-corner retroreflective element pairs formed of parallel V-shaped groove groups (x, x, x, . . . , y, y, y, . . . , and z, z, z, . . . ) from three directions (x, y, and z directions), it is preferable to use a retroreflective article characterized in that the depth of the plane (Sx, Sy, or Sz) formed of the base line group of at least one-directional V-shaped groove group is different from the depth of other planes.

Specific embodiments and advantages of such a retroreflective element in which the depth of the plane (Sx, Sy, or Sz) formed of base line group of at least one-directional V-shaped groove group is different from the depth of other planes are described in detail in International Publication Nos. WO98/18028, WO00/52503, and WO99/54760 which are to be referred to for further particulars.

The range to be shown by the following expressions (2) and (3) is preferable as the preferable difference between depths.

$$R = \frac{\sin(35.2644 - \theta) + (\tan 54.7356 + \tan 35.2644)\sin 35.2644 \sin\theta}{\sin(35.2644 - \theta)} \quad \text{Expression 2}$$

$$0.5R \leq \frac{h3}{h1} \leq 1.5R \quad \text{Expression 3}$$

In the above expressions 2 and 3,
θ=Tilt angle of pseudo optical axis
h3=Depth of V-shaped groove formed of deepest V-shaped groove group
h1=Depth of V-shaped groove formed of shallowest V-shaped groove group Moreover, to further improve both angularities such as observation angularity and incident angularity, in the case of a retroreflective article formed of many triangular-pyramidal cube-corner retroreflective element pairs formed of parallel V-shaped groove groups (x, x, x, . . . , y, y, y, . . . , and z, z, z, . . . ) from three directions (x, y, and z directions), it is possible to use a retroreflective article in which an x-directional V-shaped groove does not pass through intersects (A and B) of y-directional and z-directional V-shaped grooves and is formed at a position having an offset (Δx) from a straight line connecting the intersects A and B and the triangular-pyramidal cube-corner retroreflective element pairs are asymmetric pairs.

Specific embodiments and advantages on a retroreflective element in which triangular-pyramidal cube-corner retroreflective element pairs are asymmetric pairs are described in detail in Japanese Patent Laid-Open No. 2001-264525 and corresponding U.S. Pat. No. 6,318,866 which are to be referred to for further particulars.

It is preferable that the range of a preferable offset (Δx) of a retroreflective element pairs formed of the asymmetric pairs is kept in the range of Expression 4 when assuming the height of an element as h.

$$0.05h \leq \Delta x \leq 0.3h \quad \text{Expression 4}$$

As a base material to be preferably used for the master block of the triangular-pyramidal cube-corner retroreflective element, it is preferable to use a metallic material having a Vickers hardness of 350 or more, particularly 380 or more specified in JIS-Z2244. Specifically, it is possible to use amorphous copper, electroless copper, electrocystallized nickel, and aluminum. As an alloy material, it is possible to use any one of copper-zinc alloy (brass), copper-tin-zinc alloy, nickel-cobalt alloy, nickel-zinc alloy, and aluminum alloy.

Moreover, as the base material, it is also possible to use a synthetic-resin material. Because a trouble that a synthetic resin material is softened at the time of cutting and high-accuracy cutting becomes difficult hardly occurs, it is preferable that the base material is a material made of a synthetic resin having a glass transition point of 150° C. or higher, particularly 200° or higher and a Rockwell hardness (JIS-Z2245) of 70 or higher, particularly 75 or higher. Specifically, it is possible to use any one of polyethyleneterephthalate resin, polybutyrenephthalate resin, polycarbonate resin, polymethylmethacrylate resin, polyimide resin, polyacrylate resin, polyethersulfone resin, polyether imide resin, and cellulose triacetate resin.

A metallic film is formed on the surface of the master block of the obtained convex triangular-pyramidal cube-corner retroreflective element by electroforming the surface. By removing the metallic film from the surface of the master block, it is possible to prepare a metallic die to be used to form a resin retroreflective article of the present invention. The die worked as described above is transferred as a shape reversed by the electroforming method and provided as a concave die for resin molding.

Electroforming is generally performed in solution of 60 wt % of nickel amiosulformate at 40° C. and under current condition of 10 A/dm². By setting the electroformed-layer forming rate to, for example, 0.02 mm/h or less as an electroformed-layer forming rate, a uniform electroformed layer is easily obtained. However, at a forming rate higher than 0.02 mm/h, troubles easily occur that the smoothness of surface is lost and a defective portion occurs in an electroformed layer.

A first-generation electroforming die thus prepared from the retroreflective-element master block can be repeatedly used as an electroforming master used to prepare a second-generation electroforming die. Therefore, it is possible to prepare several electroforming dies from one retroreflective element master block.

It is possible to use a plurality of copied electroforming dies by precisely cutting them and then, combination-joining them up to a final die size for forming a retroreflective article. As the joining method, it is possible to use one of a method for precisely cutting a cutting end and then merely confronting the cut ends and a method for welding a combined joined portion by, for example, electronic beam welding, YAG laser welding, or carbon-dioxide-gas laser welding.

The combined electroforming die is used to mold a synthetic resin as a synthetic-resin molding die. As the synthetic-resin molding method, it is possible to use compression molding and injection molding.

The compression molding can be performed by inserting a thin-wall nickel electroforming die, synthetic-resin sheeting having a predetermined thickness, and a silicon-rubber sheeting having a thickness of approx. 5 mm, and silicon-rubber sheeting having a thickness of approx. 5 mm as a cushion material into a compression molding press heated to a predetermined temperature, then preheating them at a pressure of 10 to 20% of a molding pressure for 30 sec, and then heating and pressurizing them at 180 to 250° C. and 10-30 kg/cm² for approx. 2 min. Thereafter, by cooling them up to room temperature while pressurized and releasing the pressure, it is possible to obtain a prism molded article.

It is possible to mold a thick-wall nickel electroforming die molded in accordance with the above method as an injection molding die in by using a normal injection molding machine. In this case, one of the following methods can be used: injection molding method for inserting melted resin into a die while pressurizing a movable die or fixed die and an injection compressing method for opening a slight gap without pressurizing a movable die or fixed die and injecting melted resin and then, pressurizing the resin. These methods are particularly suited to manufacture a thick-wall molded article, for example, a pavement marker.

Moreover, it is possible to obtain a continuous sheeting product by joining a thin-wall electroforming die having a thickness of approx. 0.5 mm formed of the above method by the welding method to prepare an endless-belt die, setting the endless belt die on a pair of rollers constituted of a heating roller and a cooling roller and rotating the belt die, supplying melted synthetic resin in the form of sheeting, pressure-molding the resin by one or more silicone rollers, and then cooling the resin to the glass transition point or lower, and removing the resin from the belt die.

Figure 15:
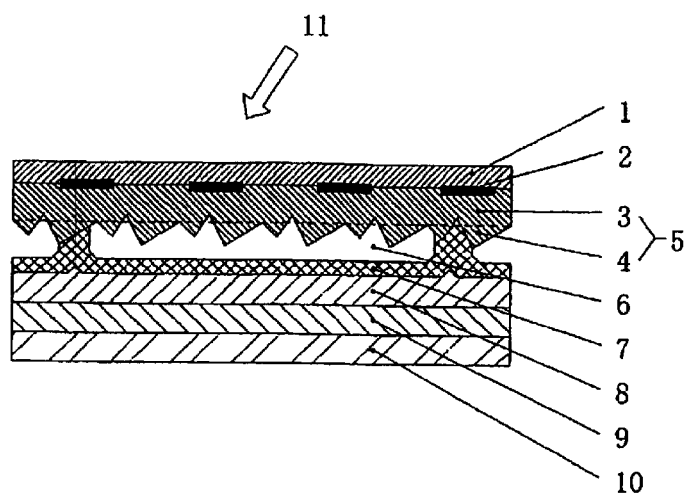
FIG. 15 is a sectional view of a retroreflective element group of the first embodiment of the present invention.

Then, an embodiment of the cube-corner retroreflective article of the first embodiment of the present invention and an embodiment of a retroreflective article having a preferable structure are described below by referring to FIG. 15 showing a sectional view of the article and the embodiment.

In FIG. 15, symbol 4 denotes a reflective element layer in which triangular-pyramidal cube-corner retroreflective element pairs (R1 and R2) of the present invention are arranged in a closet-packed state, 3 denotes a holding-body layer for holding a reflective element, and 11 denotes a light incident direction. The reflective element layer (4) and holding-body layer (3) are normally kept as one body (5). However, it is also allowed to laminate separate layers. It is possible to use a surface protective layer (1), printing layer (2) for communicating information to an observer or coloring a sheeting, binder layer (7) for realizing an enclosing sealing structure for preventing moisture from entering the back of a reflective element layer, support layer (8) for supporting the binder layer (7), and adhesive layer (9) for attaching the reflective sheeting and a retroreflective article to other structure and release layer (10).

The printing layer (2) can be normally set between the surface protective layer (1) and the holding body layer (3) or on the surface protective layer (1) or reflective lateral face of the reflective element (4). The printing layer (2) can be normally set by means such as gravure printing, screen printing, flexographic printing, thermal transfer printing, digital laser printing, or ink jet printing.

Materials for constituting the reflective element layer (4) and holding body layer (3) are not restricted as long as they satisfy the flexibility which is one of objects of the present invention. However, materials having optical transparency and uniformity are preferable. Materials which can be used for the present invention include polycarbonate resin, vinyl chloride resin, (meta)acrylic resin, epoxy resin, styrene resin, polyester resin, fluorocarbon resin, polyethylene resin, polypropylene resin, cellulose resin, and urethane resin. Moreover, it is possible to use UV absorber, light stabilizer, and antioxidant independently or by combining them. Furthermore, it is possible to contain various organic pigments, inorganic pigments, fluorescent pigments, dyes, and fluorescent dye as coloring agents.

It is possible to use the resin same as the resin used for the retroreflective element layer (4) as the surface protective layer (1). To improve weather resistance, it is possible to use UV absorber, light stabilizer, and antioxidant independently or by combining them. Moreover, it is possible to contain various organic pigments, inorganic pigments, dyes, and fluorescent dyes as coloring agents. From the viewpoint of durability, it is particularly preferable to use (meta)acrylic resin, fluorocarbon resin, polyester resin, and vinyl chloride resin.

In the case of the reflective element layer (4) of a retroreflective article of the present invention, it is general to set an air layer (6) to the back of a composite cube-corner retroreflective element in order to increase a critical angle for satisfying an internal total-reflection condition. It is preferable that the reflective element layer (4) and support layer (8) are sealed and enclosed by a binder agent layer (7) in order to prevent disadvantages such as deterioration of a critical angle and corrosion of a metal due to entry of moisture under a working condition.

As the sealing and enclosing method, it is possible to use one of the methods disclosed in U.S. Pat. Nos. 3,190,178 and 4,025,159, and Japanese Utility Model Laid-Open No. S50-28669. As the resin used for the binder layer (7), it is possible to use any one of (meta)acrylic resin, polyester resin, alkyd resin, and epoxy resin. As a junction method, it is possible to properly use any one of the following publicly-known methods: thermal-welding resin junction method, thermosetting resin junction method, Lw-curing resin conjugation method, and electron-beam-curing resin junction method.

It is possible to apply the binder layer (7) used for the present invention to the entire surface of the support layer (8) and selectively set the binder layer (7) to a junction portion with a retroreflective element layer by a method such as the printing method.

As a material constituting the support layer (8), it is possible to use any one of general resins capable of forming a film, fiber, cloth, metallic foil or plate of stainless steel and aluminum independently or by combining them.

It is possible to properly select a publicly-known layer for the adhesive layer (9) used to attach a retroreflective article of the present invention to a metallic plate, wooden plate, glass plate, or plastic plate and a publicly-known layer as the release layer (10) for the adhesive. As an adhesive, it is possible to properly select any one of publicly-known pressure-sensitive adhesive, heat sensitive adhesive, and crosslink adhesive. As the pressure-sensitive adhesive, it is possible to use any one of polyacrylic ester adhesive, silicon-resin adhesive, and rubber adhesive which are obtained by copolymerizing butyl acrylic ester such as butyl acrylate, 2-ethylhexyl acrylate, isooctyl acrylate, or nonyl acrylate with acrylic acid or polyvinyl acetate.

Figure 16:
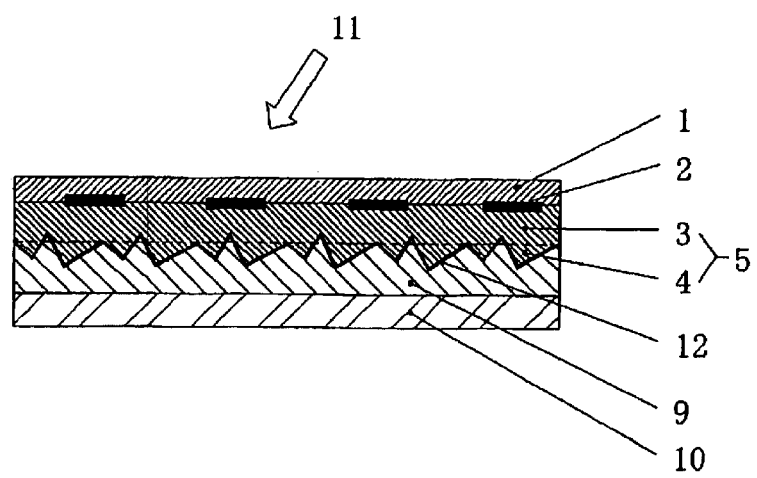
FIG. 16 is a sectional view of a retroreflective element group of the first embodiment of the present invention.

Then, another mode having a preferable structure of the retroreflective article of the first embodiment of the present invention is described below by referring to FIG. 16 showing a sectional view of the retroreflective article.

In FIG. 16, a metallic mirror reflection layer (12) is set to the reflective lateral face of the reflective element (4) and moreover, an adhesive layer and remover layer are directly contacted to the mirror reflection layer (12) and laminated. The cube-corner retroreflective article in this embodiment and a retroreflective object do not require an air layer because they retroreflect in accordance with the mirror reflection principle. Therefore, they do not require a binder layer or support layer. Moreover, in the case of the metallic mirror reflection layer (12) set to the surface of the reflective element (4) of the present invention, it is allowed that the entire element surface of the element is covered or locally or locally covered.

In a triangular-pyramidal cube-corner retroreflective article and a retroreflective object of the present invention, it is possible to form the mirror reflection layer (12) made of metal such as aluminum, copper, silver, or nickel on the surface of the reflection element (4) by using means such as vacuum deposition, chemical plating, or sputtering. Among the methods for forming the mirror reflection layer (12), the vacuum deposition method using aluminum is preferable because it is possible to lower a vacuum-deposition temperature and thereby minimize the heat deformation of a retroreflective element in a vacuum-deposition step and moreover the color tone of the mirror reflection layer (12) becomes bright.

The continuous vacuum-deposition apparatus of the aluminum mirror reflection layer (12) is constituted of a vacuum vessel capable of maintaining vacuum degree at $7\text{-}9\times10^{-4}$ mmHg, winding-off apparatus for delivering prism wholecloth sheeting constituted of two layers such as a base-substance sheeting set in the vessel and surface protective layer laminated on the surface of the base-substance sheeting at the light-incident-side, winder for winding the vacuum-deposited prism whole-cloth sheeting, and heating apparatus set between the winding-off apparatus and the winder and capable of melting aluminum by using an electric heater in a graphite pot furnace. Pure aluminum pellet having a purity of 99.99 wt % or higher is put in the graphite pot furnace and can be set by vacuum-depositing the mirror reflection layer (12) on the surface of a retroreflective element at a thickness of, for example, 0.08 to 1.0 μm by aluminum atoms melted and vaporized in conditions of 350 to 360 Volt AC, current of 115 to 120 A, and treatment rate of 30 to 70 m/min.

Second Embodiment

A method for forming the retroreflective article of second embodiment of the present invention is described below in detail by referring to the accompanying drawings.

Figure 17:
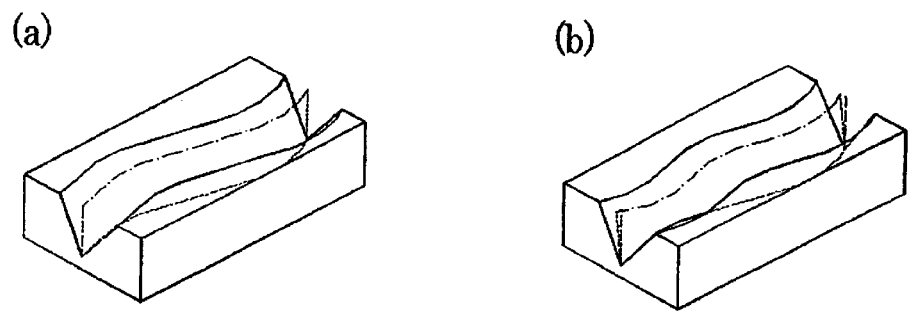
FIG. 17 is a sectional view of V-shaped grooves of second embodiment of the present invention.

FIG. 17 shows a method for forming a V-shaped groove used to form a retroreflective article formed of many triangular-pyramidal cube-corner retroreflective element pairs characterized in that a base line constituting any-directional V-shaped groove in second embodiment of the present invention is a nonlinear base line which does not form a linear trajectory and a reflective lateral face formed of the V-shaped groove forms a curved and/or multiple surface.

Figure 7:
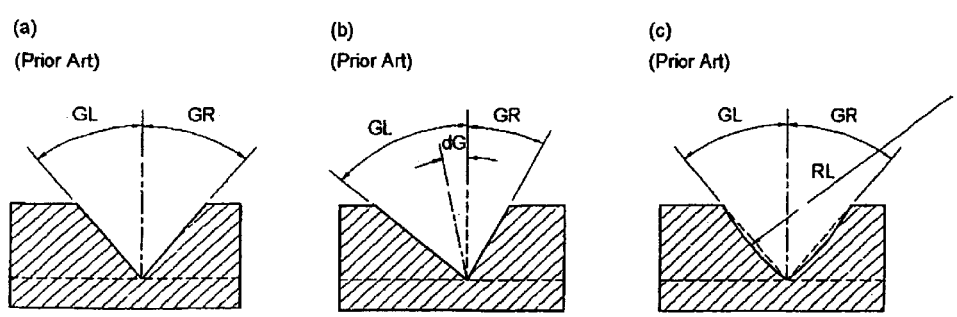
FIG. 7 is a sectional view of a V-shaped groove according to prior art.
Figure 8:
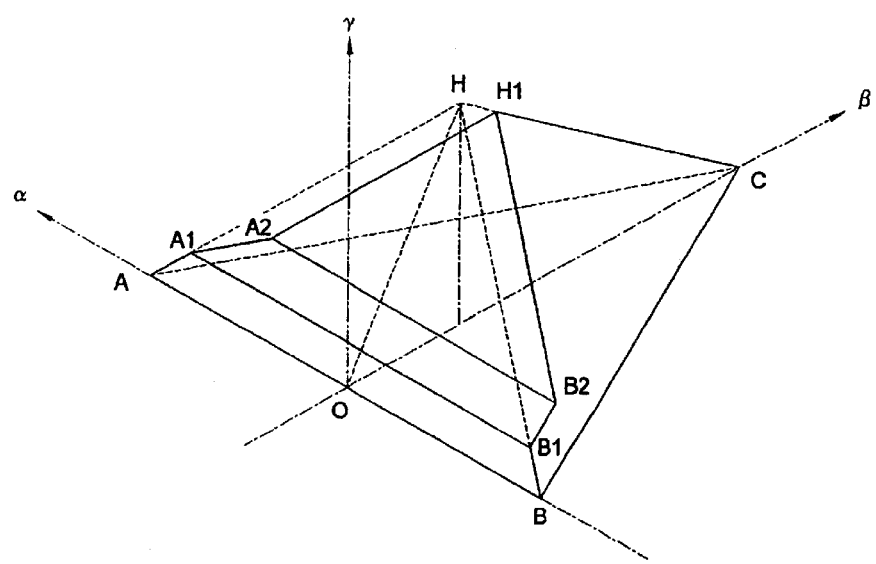
FIG. 8 is a perspective view of a retroreflective element according to prior art.

FIG. 17(a) shows a V-shaped groove in which a reflective lateral face forms a curved and/or multiple surface even if a one-side groove angle (GLx, GRx, GLy, GRy, GLz, or GRz) is a constant angle in the V-shaped groove because a base line constituting the V-shaped groove has a nonlinear trajectory which does not form a linear trajectory in the horizontally symmetric state shown in FIG. 7(a). In the case of a specific working method for working the V-shaped groove, a V-shaped groove is formed by drawing not only a straight line but also an optional trajectory by moving a working tool along the Mx axis and My axis shown in FIG. 1. Thereby, a base line by the present invention is achieved by continuously or repetitively changing a nonlinear base line of the present invention.

FIG. 17(b) shows a V-shaped groove in which a reflective lateral face forms a curved and/or multiple surface even if a one-side groove angle (GLx, GRx, GLy, GRy, GLz, or GRz) is a constant angle in the V-shaped groove because a base line constituting a V-shaped groove has a nonlinear trajectory in the horizontally asymmetric state shown in FIG. 7(b). A specific method for working the groove is the method shown in FIG. 3(d) which is achieved by tilting a working tool when working a V-shaped groove and thereby making a tool projective shape asymmetric.

When forming the V-shaped groove in FIG. 17(a) or 17(b) having a nonlinear base line, it is also possible to form a V-shaped groove using the working tool whose cross section has a curved shape shown in FIG. 7(c). Moreover, as shown in FIG. 3(c), it is possible to continuously change the angle of a V-shaped groove by slightly rotating a working tool clockwise or counterclockwise and changing projective shapes while forming a V-shaped groove in accordance with the rotation along the Mc axis. The cross-sectional shape of the V-shaped groove thereby formed does not have a constant one-side groove angle.

A triangular-pyramidal cube-corner retroreflective element pair characterized in that a base line constituting any-directional V-shaped groove is a nonlinear base line but it does not form a linear trajectory and a reflective lateral face formed of the V-shaped groove forms a curved and/or multiple surface is described below by referring to FIG. 18.

FIG. 18(a) shows a top view of a retroreflective element pair of the present invention. Two elements are set so that reflective lateral faces (A-O'-B-H1 and A-O'-B-H2) are faced each other by sharing an x-directional nonlinear base line (A-O'-B). Base lines (A-B-C1 and A-B-C2) of the two elements are present on the common plane (S-S'). The base line (A-O'-B) is a curved nonlinear base line and it is preferable that nonlinear factor (fx) specified by the maximum distance between the intersect (O') between a vertical line (O-O') extended from a both-end straight line (A-B) connecting both ends of the nonlinear base line to the nonlinear base line (A-O'-B) and the nonlinear base line is formed so as to range between 0.0001 L and 0.05 L when assuming the length of a both-end straight line as L.

Moreover, FIG. 18(b) shows cross-sectional shapes (O'-C1-H1 and O'-C2-H2) cut out by the cutting line D-D' of the retroreflective element pair shown in FIG. 18(a). The cross section of the x-directional V-shaped groove is shown as H1-O'-H2, the cross-sectional shape is a horizontally-symmetric V shape, its one-side groove angle is formed as the angle same as a normal angle in which three reflective lateral faces are vertical to each other.

Furthermore, in the case of the nonlinear base line (A-O'-B), because a horizontally-symmetric V-shaped groove is formed at a position deviated by the nonlinear factor (fx) from the both-end straight line (A-B), right and left elements are formed so that they are different in heights (h1 and h2).

In the case of a reflective element pair of the present invention, formed as described above, faced reflective lateral faces (A-O'-B-H1 and A-O'-B-H2) do not form planes but they become curved faces. However, at any position, a cross section shows a V-shaped groove shape. A reflective lateral face having the curved plane does not retroreflect incident rays toward a light source in parallel toward but it retroreflect at various angles with a slight spread. Therefore, the reflective lateral face having the curved face reflects at various reflection angles. Therefore, retroreflected rays can have a divergent pattern having uniform spread and it is possible to obtain a preferable observation angularity.

Moreover, pseudo optical axes (t1 and t2) are shown in sectional view 18(b). A part of a reflective lateral face does not have a planar shape in the present invention. Therefore, the pseudo optical axes shown here respectively denote that they respectively have the optical axis and angle same as the case of the cc retroreflective element formed by a normal planar reflective lateral face having a both-end straight line as a base line. However, a deviation from the plane of a reflective lateral face of a retroreflective element of the present invention having no planar shape has very slight and the incident angularity of the reflection element is decided by the tilt of a corresponding pseudo optical axis.

Figure 18:
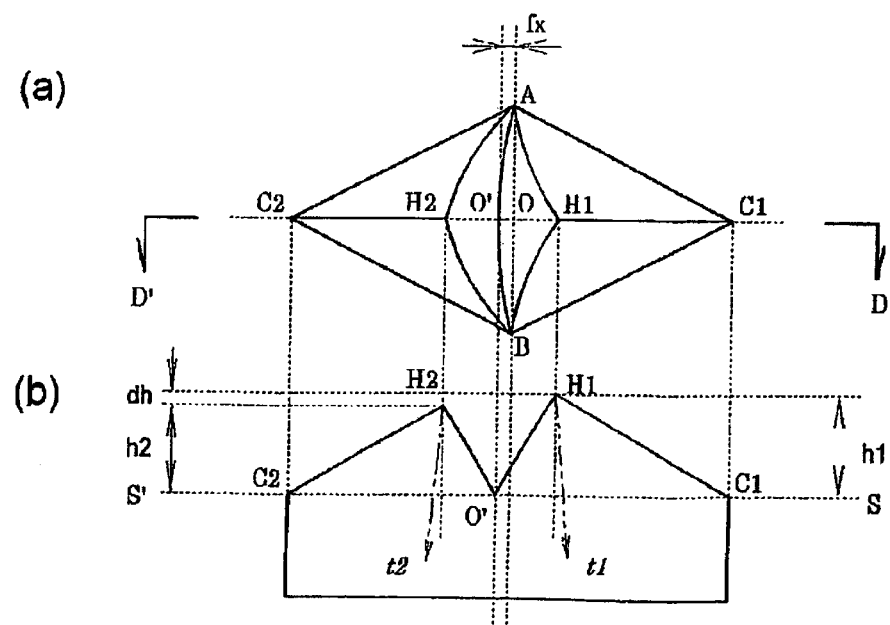
FIG. 18 is an illustration of a retroreflective element pair of the second embodiment of the present invention.
Figure 19:
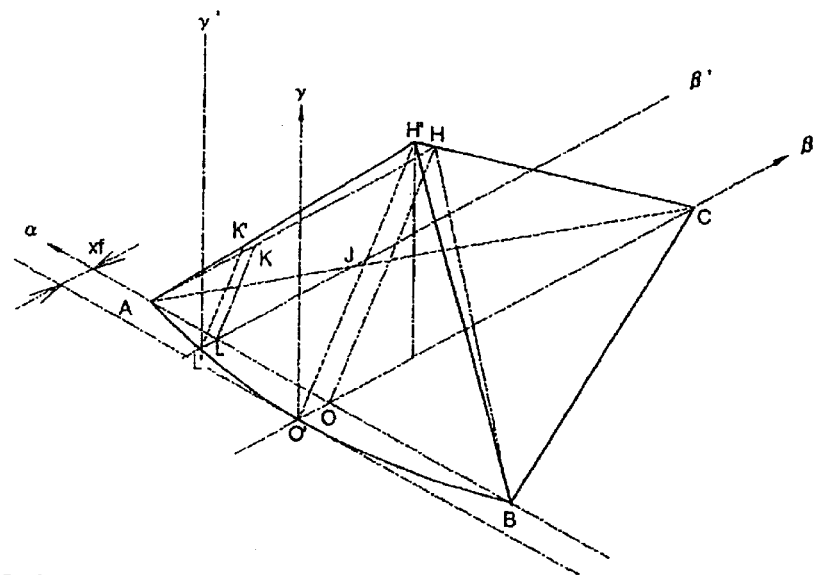
FIG. 19 is a perspective view of the retroreflective element according to the second embodiment of the present invention.

FIG. 19 shows a perspective view of the triangular-pyramidal cube-corner retroreflective element of the present invention shown in FIG. 18. Two reflective lateral faces plane a (A-C-H') and plane b (B-C-H') are present on the upper side of a bottom plane (A-B-C) decided by three base lines (A-B, B-C, and C-A) present in the common plane (S-S') and these two reflective lateral faces are planar and formed so that they are vertical to each other. Moreover, the base line of the reflective lateral face plane c (A-O'-B-H') not having a remaining planar shape for forming an element is also present on the common plane. In the case of a groove whose cross section for forming the plane c is V-shaped is formed, a one-side groove angle ($\angle\gamma$O'H') at the point O' of the base line A-B and one-side groove angle (∠γL'K') at an optional point L' are formed so as to be equal over the whole area of the base line (A-O'-B).

Figure 20:
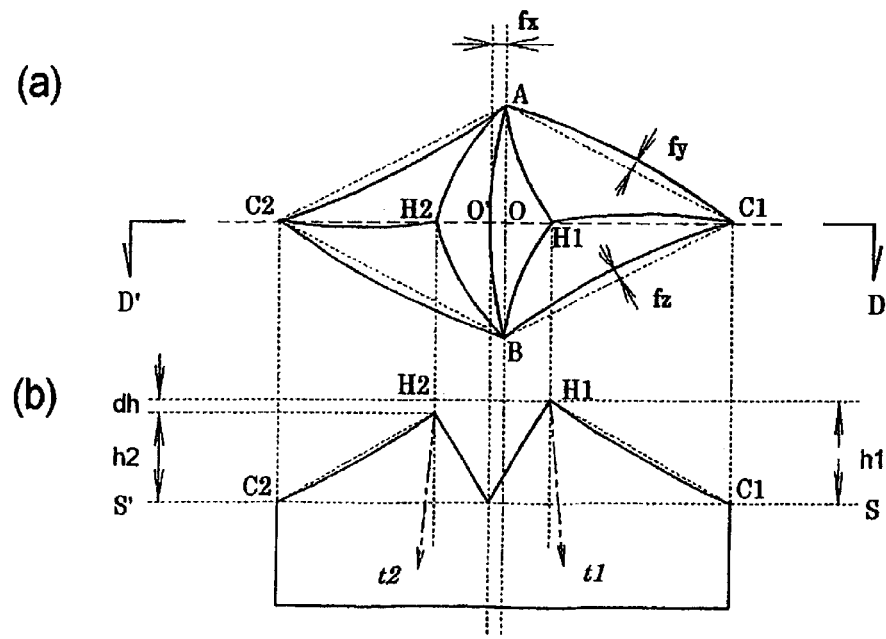
FIG. 20 is an illustration of a retroreflective element group pair according to the second embodiment of the present invention.

FIG. 20 shows a top view (a) and a sectional view (b) of another triangular-pyramidal cube-corner retroreflective element pair of the present invention. In the case of this embodiment, because all base lines respectively have a nonlinear base line, three reflective lateral faces do not form planes. In FIG. 20(a), two elements are set so that two reflective lateral faces (A-O'-B-H1 and A-O'-B-H2 are faced each other by sharing the x-directional nonlinear base line (A-O'-B). Moreover, base lines (A-O'-B-C1 and A-O'-B-C2) of two elements are present on the common plane (S-S'). The base line (A-O'-B) has the curved nonlinear base line and the nonlinear factor (fx) specified by the maximum distance between the intersect (O') between the vertical line (O-O') extended from the both-end straight line (A-B) connecting the both ends of the nonlinear base line to the nonlinear base line (A-O'-B) and the line linear base line and the both-end straight line is formed so as to range between 0.0001 L and 0.05 L when assuming the length of the both-end straight line as L. In the case of two other both sides, nonlinear factors (fy and fx) respectively specified by the maximum distance with the both-end straight line are also formed so as to range between 0.0001 L and 0.05 L when assuming the length of the both-end straight line as L. It is allowed that fx, fy, and fz are equal to or different from each other.

Moreover, FIG. 20(b) shows sectional shapes (O'-C1-H1 and O'-C2-H2) cut out by the cutting line D-D' of the retroreflective element pair shown in FIG. 20(a). The cross section of the x-directional V-shaped groove is shown as H1-O'-H2, the sectional shape is a horizontally-symmetric straight line, and its one-side groove angle is equal to a normal angle in which three reflective lateral faces are vertical to each other. Also, in the case of sectional shapes of y- and z-directional V-shaped grooves, the sectional shape is a horizontally-symmetric straight line and its one-side groove angle is the angle same as a normal angle in which three reflective lateral faces are vertical to each other.

In FIG. 20(b), in the case of the nonlinear base line (A-O'-B), a horizontally-symmetric V-shaped groove is formed at a position deviated by fx from the both-end straight line (A-B) and right and left. Therefore, right and left elements are formed so as to be different in heights (h1 and h2). However, heights of right and left elements may be equal to each other depending on values of used nonlinear factors (fx, fy, and fz).

Figure 21:
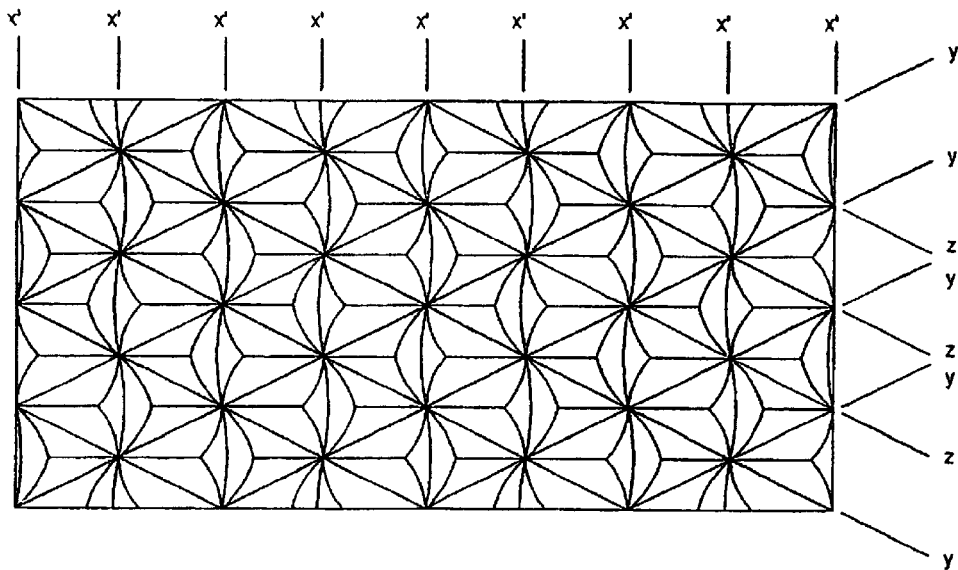
FIG. 21 is a collected top view of a retroreflective element group according to the second embodiment of the present invention.

FIG. 21 shows a top view of a retroreflective element pair group obtained by collecting many triangular-pyramidal cube-corner retroreflective element pairs shown in FIG. 18. This element pair group is formed of V-shaped groove groups (x', x', x' . . . , y, y, y, . . . , and z, z, z . . . ) from three directions of x, y, and z directions. In FIG. 21, x' denotes a V-shaped groove whose base line is not a straight line. In this embodiment, only x direction does not form a planar shape and y direction and z direction respectively have a planar reflective lateral face.

Figure 22:
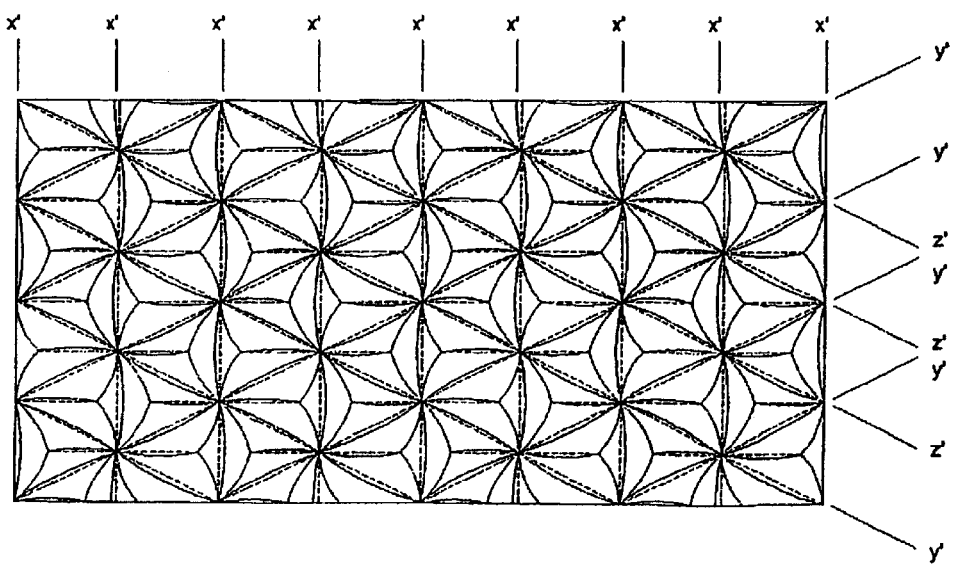
FIG. 22 is a collected top view of a retroreflective element group according to the second embodiment of the present invention.

FIG. 22 shows a top view of an element pair group in which many triangular-pyramidal cube-corner retroreflective element pairs shown in FIG. 20 are collected. This retroreflective element group is formed of V-shaped groove groups (x', x', x', . . . , y', y', y' . . . , and z', z', z' . . . ) from three directions of x, y, and z directions and every V-shaped groove is formed so that the base line is not a straight line in order for the reflective lateral face not to form a planar shape.

Moreover, it is allowed to form x-, y-, and z-directional V-shaped grooves in accordance with a repetitive pattern by combining several types of V-shaped grooves whose base lines have several types of different fx values or several types of V-shaped grooves whose base lines are straight lines. This type of a reflective element can obtain a large retroreflective performance at a small observation angle. Thus, it is a feature of the present invention not included in the prior art that reflective elements having various observation angularities can be formed by one type of a working tool.

In the case of a retroreflective element pair group constituting a retroreflective article of the present invention, it is particularly preferable that a nonlinear factor (fx, fy, or fz) ranges between 0.0001 L and 0.05 L when assuming the length of a both-end straight line as L in order to uniform a retroreflective characteristic at a wide observation angle.

In the case of similar prior arts, it is only possible to provide the deviation of a one-side groove angle or apex angle for one retroreflective element. Therefore, it is necessary to form a combination of several types of one-side groove angles and it is inevitable to use a very troublesome working method.

However, in the case of a method of the present invention using a reflective element in which a base line is not a straight line and a reflective lateral face forms a curved and/or multiple surface, it is possible to continuously slightly change an apex angle formed between a virtual contact surface vertical to a normal line at an optional reflection point of the reflective lateral face and an adjacent reflective lateral face from a theoretical angle of 90°. When using the deviation from the theoretical angle of 90° as an apex-angle deviation, the range between a reflection area in which an apex-angle deviation is 0° and a reflection area having the maximum apex-angle deviation according to an fx value can be continuously present.

Moreover, there is an advantage that an apex-angle deviation which can be provided can be simply obtained by adjusting a nonlinear factor (fx, fy, or fz). Specifically, by changing the change pattern of an fx value for one element or over several adjacent elements, for example, by increasing the number of ranges of elements respectively having a small fx value, it is possible to preferentially improve the retroreflective performance of a portion having a small observation angle and improve the retroreflective performance at a portion having a large observation angle by increasing the number of ranges of elements respectively having a large fx value.

It is preferable that an fx value which can be provided ranges between 0.0001 L and 0.05 L when assuming the length of the both-end straight line on a reflective lateral face as L. When the fx value is less than 0.0001 L, divergence of light becomes excessively small and improvement of observation angularity cannot be easily obtained. When the fx value exceeds 0.05 L, there are disadvantages that divergence of light becomes excessive and the front-directional retroreflective characteristic is extremely deteriorated. However, in the case of a method for diverging retroreflective light by the present invention, a retroreflected light flux is not split into a plurality reflection light fluxes differently from the case of providing a conventional single apex-angle deviation but a uniform retroreflective pattern having a uniform distribution is obtained as one reflection light flux.

Trajectories of nonlinear base lines of retroreflective element pairs constituting a retroreflective article of the present invention can have various shapes such as curve, rectangular line, and broken line. However, it is preferable that the pairs are many triangular-pyramidal cube-corner retroreflective element pairs characterized in that each of trajectories of the nonlinear base lines is shown by a curve selected from circular arc, trigonometric functions (sine curve, cosine curve, and tangent curve), inverse trigonometric function, elliptic function, hyperbolic function, and function obtained by combining these functions because it is possible to provide a uniform retroreflective pattern for incident lights from various azimuths of elements. Moreover, the reflective lateral face having the nonlinear base line does not form a plane but it forms a secondary or tertiary curved surface, multiplane reflective lateral face constituted of combination of the secondary and tertiary curved surfaces, or a combination of a plurality planes.

Figure 23:
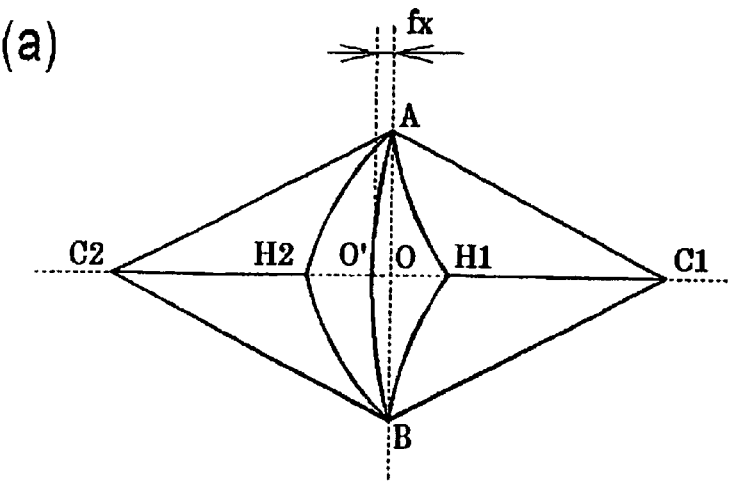
FIG. 23 is a top view of the trajectory of the nonlinear base line of a retroreflective element pair according to the second embodiment of the present invention.
Figure 23:
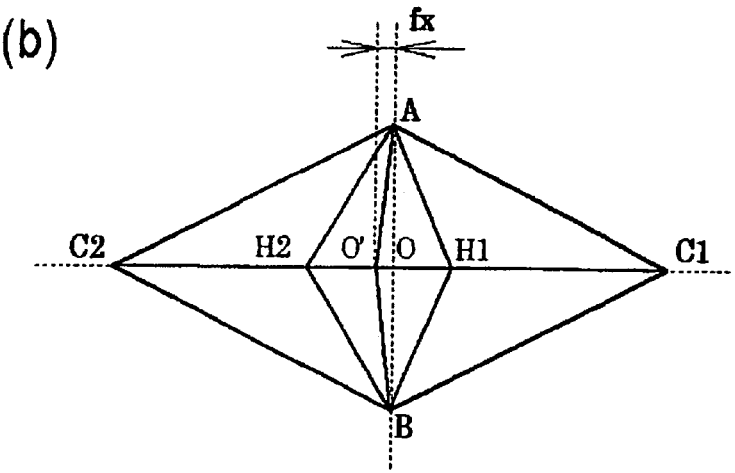
Figure 23:
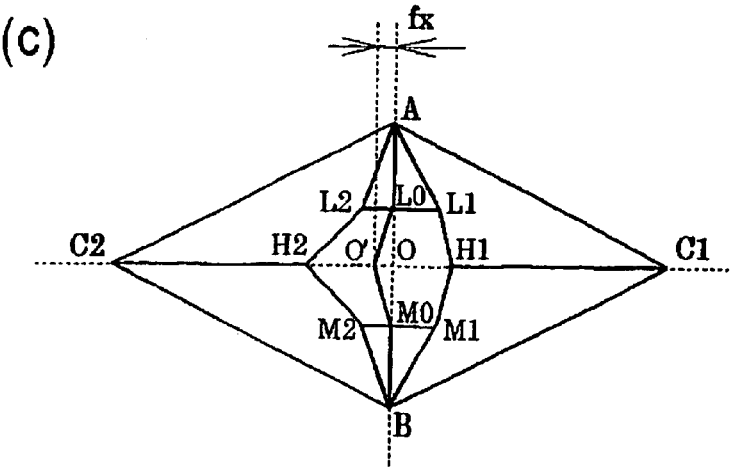

FIGS. 23(a), 23(b), and 23(c) show shapes of trajectories of nonlinear base lines which can be used for retroreflective element pairs constituting a retroreflective article of the present invention.

FIG. 23(a) shows a curved nonlinear base line (A-O'-B) formed so as to pass through apexes A and B of a bottom-plane triangle (A-O-B-C1) and the point O separated by the nonlinear factor (fx). This curve can be defined by a function showing a curve such as any one of circular arc, trigonometric function (sine curve, cosine curve, or tangent curve), inverse trigonometric function, elliptic function, and hyperbolic function. Thereby, the reflective lateral face (A-O'-B-H1) of a right element forms a bent curve.

FIG. 23(b) shows a broken-line nonlinear base line (A-O'-B) formed so as to pass through apexes A and B of the bottom-plane triangle (A-O-B-C1) and the point O' separated by the nonlinear factor (fx). The broken-line base line is bent at the point O' and thereby, the reflective lateral face (A-O'-B-H1) of a right element is divided into two subreflective lateral faces (A-O'-H1 and B-O'-H1).

FIG. 23(c) shows a broken-line nonlinear base line (A-L0-O'-M0-B) formed so as to pass through the apexes A and B of the bottom-plane triangle (A-O-B-C1), the point O' separated by the nonlinear factor (fx), and critical points L0 and M0. The broken-line base line is bent at the points O', L0, and M0 and thereby, the reflective lateral face (A-O'-B-H1) of a right element is divided into four subreflective lateral faces (A-L0-L1, L0-L1-H1-O, H1-M1-M0-O, and M0-M1-B). Two (A-L0-L1 and M0-M1-B) of these subreflective lateral faces are normal reflective lateral faces and two other subreflective lateral faces (L0-L1-H1-O and H1-M1-M0-O) do not respectively form a normal reflective lateral face.

Moreover, it is possible to selectively improve observation angularity to a constant-directional azimuth. This is achieved by selectively providing deviation to one-side groove angle for a constant-directional V-shaped groove.

Moreover, it is possible to adopt a reflective element whose one-side groove angle is not constant in one V-shaped groove. Specifically, it is preferable in order to improve observation angularity that one-side groove angle (GLx, GRx, GLy, GRy, GLz, or GRz) formed of a line decided when a plane vertically intersecting with the both-end straight line of a retroreflective element constituting a retroreflective article of the present invention intersects with the reflective lateral face and a V-shaped vertical plane (Ux, Uy, or Uz) including the both-end straight line (A-B in FIGS. 18 and 20) and a one-side groove angle (GLx, GRx, GLy, GRy, GLz, or GRz) do not form a constant angle with the maximum deviation ranging between 0.0001 and 0.1° and the reflective lateral face is a reflective element pair for forming a curved and/or multiple surface in order to improve observation angularity. In the case of this reflective element, the bottom plane does not form a straight line and the one-side groove angle does not form a constant angle over the both ends of a base line.

It is preferable that this one-side groove angle is formed so as not to form a constant angle with the maximum deviation ranging between 0.0001 and 0.1° from a normal one-side groove angle. When the maximum deviation is less than 0.0001°, divergence of retroreflective light becomes excessively small and observation angularity cannot be easily improved. When the maximum deviation exceeds 0.1°, there is a disadvantage that divergence of retroreflective light becomes excessively large and front-directional retroreflective characteristic is extremely deteriorated.

For a retroreflective element pair group constituting a retroreflective article of the present invention, it is preferable to use a triangular-pyramidal cube-corner retroreflective element pair in which one of internal angles of a bottom-plane triangle formed of the both-end straight line connecting the both ends of the base line of three reflective lateral faces constituting a reflective element ranges between 35 and 75°, preferably ranges between 45 and 70°.

Use of the retroreflective element having the bottom-plane triangle which is not an equilateral triangle has the advantage same as the fact of substantially tilting the pseudo optical axis of the element. A retroreflective element whose bottom plane is an equilateral triangle is explained below as an example. Change of internal angles of the bottom-plane triangle corresponds to the fact that the tilt of a corresponding pseudo optical axis ranges between −15 and +18° when an angle (∠ACB) kept by sides having the same length ranges between 35 and 75° and between −30 and +18° when other angles (∠ABC and ∠BAC) range between 35 and 75°.

Moreover, to further improve both observation angularity and incident angularity, in the case of a retroreflective article formed of V-shaped groove groups (x, x, x, . . . , y, y, y, . . . , and z, z, z, . . . ) from three directions (x, y, and z directions) and many triangular-pyramidal cube-corner retroreflective element pairs, it is further preferable for retroreflective element pairs constituting a retroreflective article of the present invention that the depth of at least one of planes (Sx, Sy, and Sz) formed of base lines of three-directional V-shaped groove groups (x, x, x, . . . , y, y, y, . . . , and z, z, z, . . . ) is different from the depth of other planes. In general, a disadvantage is included that the efficiency of retroreflection is deteriorated because areas of three reflective lateral faces of a reflective element obtained by tilting a pseudo optical axis become equal. The reflective element in which depths of V-shaped groove groups are different improves the disadvantage, improves the efficiency of retroreflection by decreasing the difference between areas of three reflective lateral faces, and improves observation angularity because the reflective lateral face which is a feature of a reflective element of the present invention does not have a plane.

A specific embodiments and advantages of such a retroreflective element in which the depth of a plane (Sx, Sy, or Sz) formed of a reflective lateral face group of at least one-directional V-shape groove group is different from the depth of other planes are described in detail in International Publication Nos. WO98/18028, WO00/52503, and WO99/54760 which are to be referred to for further particulars.

The range shown by the above expressions 2 and 3 is a preferable depth difference.

Figure 24:
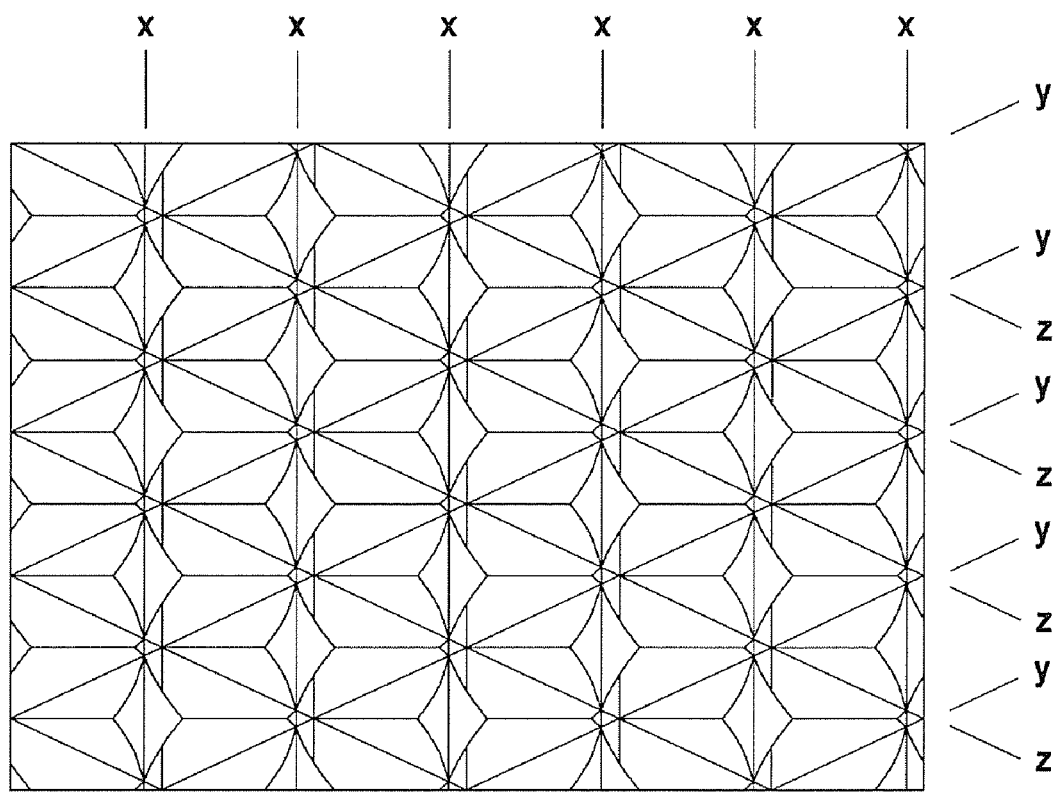
FIG. 24 is a plan view of an assembly of the retroreflective element groups according to the first embodiment of the present invention.

FIG. 24 shows a plan view of an assembly of many triangular-pyramidal cube-corner retroreflective element pairs, according to another embodiment of the present invention.

These retroreflective element pairs are formed by parallel V-shaped groove groups (x,x,x . . . y,y,y . . . z,z,z . . . ) running in the directions of x, y and z. The x-directional V-shaped grooves do not pass through the intersects of y- and z-directional V-shaped grooves but are formed each at a position having an offset from the straight lines connecting the intersects.

In this embodiment the reflective lateral faces along the x-direction only do not have plane surfaces and those along the y- and z-directions have plane reflective lateral faces.

Whereas, it is also permissible to do so form the grooves that in none of the three directions the reflective lateral faces formed by the V-shaped groove groups are plane.

Moreover, to further improve both observation angularity and incident angularity, in the case of a retroreflective article formed of V-shaped groove groups (x, x, x, . . . , y, y, y, . . . , and z, z, z, . . . ) arranged at equal intervals from three directions (x, y, and z directions) and formed of many triangular-pyramidal cube-corner retroreflective element pairs arranged at equal intervals from three directions (x, y, and z directions), it is also possible to use a retroreflective article characterized in that an x-directional V-shaped groove does not pass through intersects (A and B) of y-directional and z-directional V-shaped grooves and is formed at a position having an offset ($\Delta x$) from the both-end straight line connecting the intersects A and B, and the triangular-pyramidal cube-corner retroreflective element pair is an asymmetric pair.

A specific embodiments and advantages of the retroreflective element in which the retroreflective element pair is an asymmetric pair are described in detail in Japanese Patent Laid-Open No. 2001-264525 corresponding U.S. Pat. No. 6,318,866 which are to be referred to for further particulars.

It is preferable that the range of the preferable offset ($\Delta x$) of the asymmetric retroreflective element pair is the range in the above expression 4.

It is preferable to use the metallic material having a Vickers hardness of 350 or more, particularly 380 or more specified in JIS-Z2244 as a base material preferably used to prepare a master block used to the die for manufacturing a resin molded product constituted of a triangular-pyramidal cube-corner retroreflective element group according to the second embodiment of the present invention. Specifically, it is possible to use any one of amorphous copper, electroless copper, electrocystallized nickel, and aluminum. As an alloy material, it is possible to use any one of copper-zinc alloy (brass), copper-tin-zinc alloy, nickel-cobalt alloy, nickel-zinc alloy, and aluminum alloy.

The base material, triangular-pyramidal cube-corner retroreflective element master block, electroforming die, and sectional shape of the second embodiment of the present invention are the same as those described for the first embodiment of the present invention.

EXAMPLES

Hereafter, the present invention is further specifically described in detail in accordance with examples. However, it is needless to say that the present invention is not restricted to the examples. Examples 1 to 5 and Comparative Example 1 are related to the first embodiment of the present invention and Examples 6 to 10 and Comparative Example 2 are related to the second embodiment of the present invention.

Example 1

A die is prepared which has the shape of a retroreflective article of the present invention having a reflective lateral face with the continuous change shown in FIG. 12 so that one-side groove angles at the both sides of three-directional V-shaped grooves of a conventionally-known triangular-pyramidal cube-corner element having the shape shown as Example 1 in Table 1 becomes smaller than a normal one-side groove angle by the maximum degree of 0.01°. In this case, cosine angles ($\eta$) of a cutting tool at points A and O are 0°, the slewing angle ($\eta$) of the cutting tool at the middle point between the points A and O is 1.55°, and the cosine angle between 0 and 1.55° is continuously changed. The shape of a prepared element has a height (h) of 100 µm and the tilt angle of 0° of a pseudo optical axis. A die having this shape is molded into a nickel die base material in accordance with the fly cutting method and prepared a retroreflective article as Article 1 of the present invention through the compression molding by using the polycarbonate sheeting having a thickness of 200 µm ("IUPILON H3000" made by Mitsubishi Engineering-Plastics Corporation).

Example 2

A die is prepared in accordance with the method same as the case of Example 1, which has the shape of a retroreflective article of the present invention having a reflective lateral face of the present invention having the continuous change shown in FIG. 12 so that one-side groove angles of the both sides of a three-directional V-shaped groove of a conventionally-known triangular-pyramidal cube-corner element having the shape shown as Example 2 in Table 1 becomes smaller by the maximum degree of 0.01° from a normal one-side groove angle. The shape of the prepared element has a height (h) of 100 µm and the tilt angle of +70 of a pseudo optical axis. The die having the above shape is molded into a nickel base material in accordance with the fly cutting method and then, a concave molding die is molded by using the electroforming method and prepared a retroreflective article as Article 2 of the present invention in accordance with the compression molding by using the polycarbonate sheeting having a thickness of 200 µm ("IUPILON H3000" made by Mitsubishi Engineering-Plastics Corporation).

Example 3

A die is prepared in accordance with the same method as the case of Example 1, which has a retroreflective article of the present invention having a reflective lateral face having the continuous change shown in FIG. 12 so that one-side groove angles at the both sides of a three-directional V-shaped groove of a conventionally-known triangular-pyramidal cube-corner element having the shape shown as Example 3 in Table 1 become smaller than a normal one-side groove angle by the maximum degree of 0.01°. The shape of the prepared element has a height (h) of 100 µm and a title angle of −7° of a pseudo optical axis. A die having the above shape is molded into a nickel die base material in accordance with the fly cutting method and then, a concave molding die is molded by using the electroforming method and prepared a retroreflective article as Article 3 of the present invention in accordance with the compression molding by using the polycarbonate sheeting having a thickness of 200 µm ("IUPILON H3000" made by Mitsubishi Engineering-Plastics Corporation).

Example 4

A die is prepared in accordance with the same method as the case of Example 1, which has the shape of a retroreflective article of the present invention having a reflective lateral face having the continuous change shown in FIG. 12 so that one-side groove angles at the both sides of a three-directional V-shaped groove of a conventionally-known triangular-pyramidal cube-corner element having the shape shown as Example 4 in Table 1 become smaller than a normal one-side groove angle by the maximum degree of 0.01°. The shape of the prepared element has a height (h) of 100 μm and a tilt angle of +7° of a pseudo optical axis and the difference of depth between the x-directional V-shaped groove and y- and z-directional V-shaped grooves is 10 μm. The die having this shape is molded into a nickel die base material in accordance with the fly cutting method and then, a concave molding die is prepared by using the electroforming method and prepared a retroreflective article as Article 4 of the present invention in accordance with the compression molding by using the polycarbonate sheeting having a thickness of 200 μm ("IUPILON H3000" made by Mitsubishi Engineering-Plastics Corporation).

Example 5

A die is prepared in accordance with the same method as the case of Example 1, which has the shape of a retroreflective article of the present invention having a reflective lateral face having the continuous change shown in FIG. 12 so that one-side groove angles at the both sides of a three-directional V-shaped groove of a conventionally-known triangular-pyramidal cube-corner element having the shape shown as Example 5 in Table 1 become smaller than a normal one-side groove angle by the maximum degree of 0.01°. The shape of the prepared element has a height (h) of 100 μm, the tilt angle of a pseudo optical axis is +10, the difference of depth between x-directional V-shaped groove and y-directional and z-directional V-shaped grooves is 5 μm, the offset (Δx) of the ex-directional V-shaped groove is 10 μm. A die having the above shape is molded into a nickel die base material by using the electroforming method and prepared a retroreflective article as Article 5 of the present invention through the compression molding by using the polycarbonate sheeting having a thickness of 200 μm ("IUPILON H3000" made by Mitsubishi Engineering-Plastics Corporation).

Comparative Example 1

A die is prepared which has the shape of a reflective article constituted of conventionally-known triangular-pyramidal cube-corner retroreflective element pairs having the shape shown as Comparative Example 1 in Table 1. The shape of the prepared element has a height (h) of 100 μm and the tilt angle of 0° of a pseudo optical axis. The die having the above shape is molded into a nickel die base material in accordance with the fly cutting method, then a concave molding die is molded by using the electroforming method and molded and prepared a retroreflective article as Comparative Article 1 through the compression molding by using the polycarbonate sheeting having a thickness of 200 μm ("IUPILON H3000" made by Mitsubishi Engineering-Plastics Corporation).

TABLE 1

|  |  | Example 1 | Example 2 | Example 3 | Exampl 4 | Example 5 | Comparative Example 1 |
|---|---|---|---|---|---|---|---|
| V-groove depth (μm) | z-directional groove | 100 | 100 | 100 | 100 | 100 | 100 |
|  | y-directional groove | 100 | 100 | 100 | 100 | 100 | 100 |
|  | x-directional groove | 100 | 100 | 100 | 110 | 105 | 100 |
| Difference of V-groove depth: Δh(μm) |  | 0 | 0 | 0 | 10 | 5 | 0 |
| Tilt angle of (pseudo) optical axis: θ(°) |  | 0 | 7 | −7 | 7 | 1 | 0 |
| Offset: Δx(μm) |  | 0 | 0 | 0 | 0 | 10 | 0 |
| Both-side groove angle (°) | z-directional groove | 70.53 | 77.04 | 63.11 | 77.04 | 71.52 | 70.53 |
|  | y-directional groove | 70.53 | 77.04 | 63.11 | 77.04 | 71.52 | 70.53 |
|  | x-directional groove | 70.53 | 56.53 | 84.53 | 56.53 | 68.53 | 70.53 |
| V-groove pitch (μm) | z-directional groove | 212.13 | 205.23 | 224.25 | 205.23 | 210.87 | 212.13 |
|  | y-directional groove | 212.13 | 205.23 | 224.25 | 205.23 | 210.87 | 212.13 |
|  | x-directional groove | 212.13 | 239.76 | 200.92 | 239.76 | 214.91 | 212.13 |
| Internal angle of bottom-plane triangle (°) | Internal angle of yz-groove | 60.00 | 50.68 | 67.85 | 50.68 | 58.76 | 60.00 |
|  | Internal angle of yx-groove | 60.00 | 64.66 | 56.08 | 64.66 | 60.62 | 60.00 |
|  | Internal angle of zx-groove | 60.00 | 64.66 | 56.08 | 64.66 | 60.62 | 60.00 |

<Retroreflective Coefficient>

Retroreflective coefficients of examples and described in this specification are measured by the method described below. As a retroreflective-coefficient measuring instrument, "Model 920" made by GAMMA SCIENTIFIC is used. The retroreflective coefficient of a retroreflective article of 100 mm×100 mm is properly measured on five places of the article under angular conditions of observation angles of 0.2°, 0.5° and 1.0° and incident angles of 5°, 10°, and 30° in accordance with ASTM E810-91 and the average value of five measured values is assumed as the retroreflective coefficient of the retroreflective article.

<Measurement Results>

Retroreflective coefficients of the above Articles 1 to 5 of the present invention and Comparative Article 1 are measured to obtain the values in the following Table 2.

TABLE 2

| Observation angle | Incident angle | Example 1 | Example 2 | Example 3 | Example 4 | Example 5 | Comparative Example 1 |
|---|---|---|---|---|---|---|---|
| 0.2° | 5° | 651 | 520 | 534 | 578 | 599 | 821 |
|  | 10° | 430 | 456 | 478 | 473 | 512 | 552 |
|  | 30° | 309 | 370 | 341 | 387 | 364 | 269 |
| 0.5° | 5° | 362 | 352 | 342 | 378 | 347 | 313 |
|  | 10° | 226 | 235 | 228 | 256 | 267 | 156 |
|  | 30° | 107 | 171 | 164 | 182 | 173 | 80 |
| 1° | 5° | 95 | 145 | 127 | 147 | 132 | 49 |
|  | 10° | 75 | 107 | 98 | 116 | 94 | 35 |
|  | 30° | 47 | 85 | 74 | 89 | 79 | 18 |

Any invention has superior retroreflective performance, particularly superior observation angularity compared with Comparative Example 1.

Example 6

A triangular-pyramidal cube-corner retroreflective element having the shape shown in FIGS. 20 and 22 for explaining the present invention is prepared in which the tilt angle of a pseudo optical axis is 0° and formed of V-shaped groove groups (x, x, x, ..., y, y, y, ..., and z, z, z, ...) arranged at equal intervals from three directions, intervals (V-groove pitch) of the three-directional V-shaped groove groups are 213.13 μm, any both-side groove angle (sum of one-side groove angles) is constant at 70.53°, depth of a V-shaped groove is constant at 100° μm, and internal angles of bottom-plane triangles are all 60°.

In this case, the V-shaped groove has the curved shape shown by x', y', and z' shown in FIG. 22 and its curved trajectory is decided by a tangent curve passing through apexes (A, B, C1, and C2) of the bottom plane of the reflective element in FIG. 18. The x-directional nonlinear factor (fx) shown by the line A-B in FIG. 20 is 0.5 μm and y-directional and z-directional nonlinear factors (fy and fz) are also respectively set to 0.5 μm. Table 1 shows these working parameters and parameters showing element shapes.

A die having the above shape is molded into a nickel die base material in accordance with the shaper method and then a concave molding die is molded by using the polycarbonate sheeting having a thickness of 200 μm ("IUPILON H3000" made by Mitsubishi Engineering-Plastics Corporation) and prepared a retroreflective article as Article 6 of the present invention through the compression molding by using the electroforming method.

Example 7

A triangular-pyramidal cube-corner retroreflective element having the shape shown in FIGS. 18 and 21 for explaining the present invention is prepared in which the tilt angle of a pseudo optical axis is +7°, the element is formed of V-shaped groove groups (x, x, x, ..., y, y, y, ..., and z, z, z, ...) arranged at equal intervals from three directions, intervals (V-groove pitch) of these three-directional V-shaped groove groups are 239.76 μm in x direction and 205.23 μm in y and z directions, both-side groove angle (sum of one-side groove angles) is 56.53° in x direction and 77.04° in y and z directions which are constant, the depth of the V-shaped groove is 100 μm which is constant, the internal angle of a bottom-plane triangle for holding a y-z groove is 50.68°, and internal angles for holding a y-z groove and 64.66° and internal angles for holding z-x groove and x-y groove are 64.66°.

In this case, the V-shaped groove has the curved shape shown by x' in FIG. 21 and its trajectory is decided by a sine curve passing through apexes A and B of the bottom plane of the reflective element shown in FIG. 18. The x-directional nonlinear factor (fx) shown by the line A-B in FIG. 18 is set to 0.5 μm. Table 3 shows these working parameters and parameters showing element shapes.

A die having the above shape is molded into a nickel die base material in accordance with the shaper method and then, a concave forming die is molded in accordance with the electroforming method and prepared a retroreflective article as Article 7 of the present invention's through the compression molding by using the polycarbonate sheeting having a thickness of 200 μm ("IUPILON H3000 made by Mitsubishi Engineering-Plastics Corporation).

Example 8

A triangular-pyramidal cube-corner retroreflective element having the shape shown in FIGS. 18 and 21 for explaining the present invention is prepared in which the tilt angle of a pseudo optical axis is +7°, the element is formed of V-shaped groove groups (x, x, x, ..., y, y, y, ..., and z, z, z, ...) arranged at equal intervals from three directions, intervals (V-shape pitch) of these three-directional V-shape groove groups are 239.76 μm in x direction and 205.23 μm in y and z directions, any both-side groove angle (sum of one-side groove angles) is 56.53° in x direction and 77.04° in y and z directions which are constant, depths of V-shaped grooves are constant, and the internal angle of a bottom-plane triangle is 50.68° in internal angle for holding a y-z groove and the internal angle of the triangle is 64.66° in internal angle for holding z-x groove and x-y groove.

In this case, the V-shaped groove has a curved shape shown by x', y', and z' shown in FIG. 21 and its curved trajectory is decided by the sine curve passing through apexes (A, B, C1, and C2) of the bottom plane of the reflective element shown in FIG. 18. The x-directional nonlinear factor (fx) shown by the line A-B in FIG. 18 is set to 0.5 μm and y- and z-directional nonlinear factors (fy and fz) are also set to 0.5 μm. Table 2 shows these working parameters and parameters showing element shapes.

A die having the above shape is molded into a nickel die base material in accordance with the shaper method and then, a concave forming die is molded by using the electroforming method and prepared a retroreflective article as Article 8 of the present invention through compression molding by using the polycarbonate sheeting having a thickness of 200 μm ("IUPILON H3000" made by Mitsubishi Engineering-Plastics Corporation).

Example 9

A retroreflective element of the present invention is prepared in accordance with the same method as the case of Example 8 except that the depth of grooves of an x-directional V-shaped groove group (x') is set to 110 μm in Example 8. A die having the above shape is molded into a nickel die base material in accordance with the shaper method and then a concave forming die is molded by using the electroforming method a retroreflective article as Article 9 of the present invention through compression molding by using the polycarbonate sheeting having a thickness of 200 μm ("IUPILON H3000" made by Mitsubishi Engineering-Plastics Corporation).

Example 10

A triangular-pyramidal cube-corner retroreflective element having the shape shown in FIGS. 18 and 21 for explaining the present invention is prepared in which the tilt angle of a pseudo optical axis is −7°, the element is constituted of V-shaped groove groups (x, x, x, . . . , y, y, y, . . . , and z, z, z, . . . ) arranged at equal intervals from three directions, and interval (V-groove pitch) between the three-directional V-shaped groove groups is 200.92 μm in x direction and 224.25 μm in y and z directions, any both-side groove angle (sum of one-side groove angles) is 84.53° and 63.11° in y and z directions which are constant, the depth of a V-shaped groove is 100 μm which is constant, and the internal angle for holding a y-z groove is 67.85° in internal angle of a bottom-plane triangle for holding a y-z groove and of a bottom-plane triangle and 56.08° in internal angles for holding z-x groove and x-y groove.

In this case, the V-shaped groove has the curved shape shown by x', y', and z' in FIG. 21 and its curved trajectory is decided by the sine curve passing through the apexes (A, B, C1, and C2) of the bottom plane of the reflective element shown in FIG. 18. The x-directional nonlinear factor (fx) shown by the line A-B in FIG. 18 is set to 0.5 μm and nonlinear factors (fy and fz) are also set to 0.5 μm. Table 3 shows these working parameters and parameters showing element shapes.

A die having the above shape is molded into a nickel die base material in accordance with the shaper method and then, a concave forming die is molded by using the electroforming method and prepared a retroreflective article as Article 10 of the present invention in accordance with the compression molding by using the polycarbonate sheeting having a thickness of 200 μm ("IUPILON H3000" made by Mitsubishi Engineering-Plastics Corporation).

Comparative Example 2

A die is prepared which has the shape of a reflective article constituted of conventionally-known triangular-pyramidal cube-corner retroreflective element pairs having the shape shown as Comparative Example 2 in Table 3. The prepared element has a height (h) of 100 μm and a tilt angle of optical axis of 0°. A die having the above shape is molded into a nickel die base material in accordance with the fly cutting method and then a concave forming die is molded by using the electroforming method as Comparative Article 2 in accordance with the compression molding by using the polycarbonate sheeting having a thickness of 200 μm ("IUPILON H3000" made by Mitsubishi Engineering-Plastics Corporation)

TABLE 3

| | | Example 6 | Example 7 | Example 8 | Example 9 | Example 10 | Comparative Example 2 |
|---|---|---|---|---|---|---|---|
| Drawing showing element shape | | FIG. 20 | FIG. 18 | FIG. 20 | (FIG. 20) | FIG. 18 | FIG. 5 |
| Tilt angle of (pseudo) optical axis: θ(°) | | 0 | 7 | 7 | 7 | −7 | 0 |
| Difference of groove depth: Δh(μm) | | 0 | 0 | 0 | 10 | 0 | 0 |
| V-groove depth (μm) | z-directional groove | 100 | 100 | 100 | 100 | 100 | 100 |
| | y-directional groove | 100 | 100 | 100 | 100 | 100 | 100 |
| | x-directional groove | 100 | 100 | 100 | 110 | 100 | 100 |
| Nonlinear factor (fx, fy, fz; μm) | z-directional groove | 0.5 | 0 | 0.5 | 0.5 | 0.5 | 0 |
| | y-directional groove | 0.5 | 0 | 0.5 | 0.5 | 0.5 | 0 |
| | x-directional groove | 0.5 | 1 | 0.5 | 0.5 | 0.5 | 0 |
| Normal both-side groove angle (°) | z-directional groove | 70.53 | 77.04 | 77.04 | 77.04 | 63.11 | 70.53 |
| | y-directional groove | 70.53 | 77.04 | 77.04 | 77.04 | 63.11 | 70.53 |
| | x-directional groove | 70.53 | 56.53 | 56.53 | 56.53 | 84.53 | 70.53 |
| V-groove pitch (μm) | z-directional groove | 212.13 | 205.23 | 205.23 | 205.23 | 224.25 | 212.13 |
| | y-directional groove | 212.13 | 205.23 | 205.23 | 205.23 | 224.25 | 212.13 |
| | x-directional groove | 212.13 | 239.76 | 239.76 | 239.76 | 200.92 | 212.13 |
| Internal angle of bottom-plane triangle (°) | Internal angle of y-z groove | 60.00 | 50.68 | 50.68 | 50.68 | 67.85 | 60.00 |
| | Internal angle of y-x groove | 60.00 | 64.66 | 64.66 | 64.66 | 56.08 | 60.00 |
| | Internal angle of z-x groove | 60.00 | 64.66 | 64.66 | 64.66 | 56.08 | 60.00 |

<Measurement Result>

Retroreflective coefficients of the above Articles 6 to 10 of the present inventions and Comparative Article 2 are measured and the following values in Table 4 are obtained.

TABLE 4

| Observation angle | Incident angle | Example 6 | Example 7 | Example 8 | Example 9 | Example 10 | Comparative Example 2 |
|---|---|---|---|---|---|---|---|
| 0.2° | 5° | 677 | 518 | 543 | 633 | 612 | 821 |
|  | 10° | 485 | 458 | 475 | 520 | 507 | 552 |
|  | 30° | 295 | 327 | 347 | 393 | 406 | 269 |
| 0.5° | 5° | 346 | 352 | 342 | 375 | 358 | 313 |
|  | 10° | 226 | 228 | 231 | 254 | 264 | 156 |
|  | 30° | 129 | 165 | 165 | 185 | 185 | 80 |
| 1° | 5° | 103 | 141 | 128 | 144 | 135 | 49 |
|  | 10° | 79 | 98 | 100 | 119 | 101 | 35 |
|  | 30° | 51 | 81 | 72 | 93 | 82 | 18 |

Any invention has a superior reflective performance compared to Comparative Example 2, particularly has a superior observation angle characteristic.

INDUSTRIAL APPLICABILITY

The present invention is helpfully used for signs such as road signs (general traffic sign and delineator), road marks (pavement markers), and construction signs, number plates of vehicles such as automobile and motorcycle, reflective tapes to be attached to bodies of truck and trailer, safety materials of apparel and lifesaver, markings of signboards, and reflectors of visible-light, laser-beam, or infrared-light reflective sensors.

The invention claimed is:

1. A retroreflective article comprising plural triangular-pyramidal cube-corner retroreflective element pairs formed of parallel V-shaped groove groups (x, x, x, . . . , y, y, y, . . . , and z, z, z, . . . ) from three directions of x direction, y direction, and z direction and set on a common plane (S-S') defined by base line groups of the parallel V-shaped groove groups, in which
   (I) one-side groove angle (GLx, GRx, GLy, GRy, GLz, or GRz) formed between a cross line between (i) a plane vertical to the common plane (S-S') and to a V-groove vertical plane (Svx, Svy, or Svz) which includes the base line of a V-shaped groove and is vertical to the common plane (S-S'), and a reflective lateral face (a1, b1, c1, a2, b2, or c2) containing the base line of the V-shaped groove and (ii) the V-groove vertical plane does not form a constant angle in the reflective lateral face but at least one of the lateral faces does not form a plane, and
   (II) at least one of said parallel V-shaped groove groups comprises a V-shaped groove angle in which a one-side groove angle (GL or GR) continuously changes in a horizontally-symmetric state (GL=GR), said one-side groove angle does not form a constant angle in the reflective lateral face, and the reflective lateral face forms a curved and/or multiple surface.

2. The retroreflective article according to claim 1, wherein at least one reflective lateral face for constituting the triangular-pyramidal cube-corner retroreflective element pairs, the one-side groove angle (GLx, GRx, GLy, GRy, GRz, or GRz) does not form a constant angle with the maximum deviation of 0.0001 to 0.1° from a normal one-side groove angle for forming a cube corner and a reflective lateral face forms a curved and/or multiple surface.

3. The retroreflective article of claim 1, wherein said V-shaped groove in which a one-side groove angle continuously changes in a horizontally-symmetric state has a curved shape.

4. A retroreflective article comprising plural triangular-pyramidal cube-corner retroreflective element pairs formed of parallel V-shaped groove groups (x, x, x, . . . , y, y, y, . . . , and z, z, z, . . . ) from three directions of x direction, y direction, and z direction and set on a common plane (S-S') defined by base line groups of the parallel V-shaped groove groups, in which
   (I) one-side groove angle (GLx, GRx, GLy, GRy, GLz, or GRz) formed between a cross line between (i) a plane vertical to the common plane (S-S') and to a V-groove vertical plane (Svx, Svy, or Svz) which includes the base line of a V-shaped groove and is vertical to the common plane (S-S'), and a reflective lateral face (a1, b1, c1, a2, b2, or c2) containing the base line of the V-shaped groove and (ii) the V-groove vertical plane does not form a constant angle in the reflective lateral face but at least one of the lateral faces does not form a plane, and
   (II) at least one of said parallel V-shaped groove groups comprises a V-shaped groove in which a one-side groove angle (GL or GR) continuously changes in a horizontally-asymmetric state, said one-side groove angle does not form a constant angle in the reflective lateral face, and the reflective lateral face forms a curved and/or multiple surface.

5. The retroreflective article according to claim 4, wherein at least one reflective lateral face for constituting the triangular-pyramidal cube-corner retroreflective element pairs, the one-side groove angle (GLx, GRx, GLy, GRy, GRz, or GRz) does not form a constant angle with the maximum deviation of 0.0001 to 0.1° from a normal one-side groove angle for forming a cube corner and a reflective lateral face forms a curved and/or multiple surface.

6. A retroreflective article according to claims 1, 2 or 3, wherein the internal angle of one of bottom-plane triangles formed of three bottom planes constituting the reflective elements ranges between 35 and 75°.

7. The retroreflective article according to claim 6, wherein the internal angle of one of bottom-plane triangles formed of three base lines constituting the reflective elements ranges between 45 and 70°.

8. The retroreflective article according to claim 7, wherein the depth of a plane (Sx, Sy, or Sz) formed by the base line group of at least one-directional V-shaped groove constituting the reflective elements is different from the depth of other planes.

9. The retroreflective article according to claim 8, wherein an x-directional V-shaped groove constituting the reflective elements does not pass through the intersects (A and B) of y- and z-directional V-shaped grooves and is formed at a position having an offset ($\Delta x$) from a straight line connecting intersects A and B, the triangular-pyramidal cube-corner retroreflective element pairs are asymmetric pairs.

10. A retroreflective article according to claim 4 or 5, wherein the internal angle of one of bottom-plane triangles formed of three bottom planes constituting the reflective elements ranges between 35 and 75°.

11. The retroreflective article according to claim 10, wherein the internal angle of one of bottom-plane triangles formed of three base lines constituting the reflective elements ranges between 45 and 70°.

12. The retroreflective article according to claim 11, wherein the depth of a plane (Sx, Sy, or Sz) formed by the base line group of at least one-directional V-shaped groove constituting the reflective elements is different from the depth of other planes.

13. The retroreflective article according to claim 12, wherein an x-directional V-shaped groove constituting the reflective elements does not pass through the intersects (A and B) of y- and z-directional V-shaped grooves and is formed at a position having an offset ($\Delta x$) from a straight line connecting intersects A and B, the triangular-pyramidal cube-corner retroreflective element pairs are asymmetric pairs.

* * * * *

UNITED STATES PATENT AND TRADEMARK OFFICE
CERTIFICATE OF CORRECTION

PATENT NO. : 7,670,013 B2
APPLICATION NO. : 10/581490
DATED : March 2, 2010
INVENTOR(S) : Ikuo Mimura It is certified that error appears in the above-identified patent and that said Letters Patent is hereby corrected as shown below:

COLUMN 1:

Line 33, "between plane" should read --between a plane--; and
Line 34, "a V-groove vertical a" should read --to a V-groove vertical--.

COLUMN 3:

Line 44, "in" should be deleted; and
Line 50, "improves" should read --solves--.

COLUMN 4:

Line 27, "elements" should read --element--; and
Line 29, "element" should read --elements--.

COLUMN 6:

Line 4, "an" should read --a--;
Line 18, "cc" should read --cube-corner--; and
Line 64, "z,z,z...arranged" should read --z,z,z...) arranged--.

COLUMN 8:

Line 19, "z,z,z...in" should read --z,z,z...) in--.

COLUMN 9:

Line 54, "and" should be deleted; and
Line 57, "invention." should read --invention; and--.

Signed and Sealed this

Eighth Day of June, 2010

David J. Kappos
*Director of the United States Patent and Trademark Office*

COLUMN 10:

Line 2, "a" should be deleted; and
    Line 31, "form" should read --forms--.

COLUMN 11:

Line 33, "projective angle" should read --projective angle G'--;
    Line 35, "far-outruns" should read --far outruns--; and
    Line 54, "α-β-γaxis" should read --α-β-γ axis--.

COLUMN 12:

Line 8, "tile" should read --tilt--.

COLUMN 14:

Line 12, "H1-O—H2," should read --H1-O-H2,--; and
    Lines 19-21, ", the cross section of the x-directional V-shaped grove is shown as K1'-O-K2" should be deleted.

COLUMN 15:

Line 6, "plane c a" should read --plane c, a--;
    Line 65, "from" should be deleted; and
    Line 66, "on" should read --from--.

COLUMN 16:

Line 56, "-15 and +180," should read -- -15 and +18°,--; and
    Line 57, "and" (second occurrence) should be deleted.

COLUMN 18:

Line 4, "polybutyrenephthalate" should read --polybutylenephthalate--;
    Line 18, "amiosulformate" should read --aminosulfonate--; and
    Line 57, "in" should be deleted.

COLUMN 20:

Line 12, "Lw-curing" should read --UV-curing--; and
    Line 51, "or locally" (second occurrence) should be deleted.

CERTIFICATE OF CORRECTION (continued)
U.S. Pat. No. 7,670,013 B2

COLUMN 22:

Line 37, "toward" (second occurrence) should be deleted and "retroreflect" should read --retroreflects--;
    Line 48, "cc" should read --cube-corner--; and
    Line 52, "has" should read --is--.

COLUMN 23:

Line 10, "A-O'-B-H2" should read --A-O'-B-H2)--; and
    Line 19, "line linear" should read --linear--.

COLUMN 25:

Line 9, "trajectries" should read --trajectories--; and
    Line 15, "point O" should read --point O'--.

COLUMN 26:

Line 46, "A specific" should read --Specific--; and
    Line 60, "the directions" should read --three directions--.

COLUMN 27:

Line 1, "do" should be deleted;
    Line 19, "A specific" should read --Specific--;
    Line 22, "corresponding" should read --corresponding to--; and
    Line 31, "used to" should read --used for--.

COLUMN 28:

Line 30, "+70" should read --+7°--; and
    Line 53, "title angle" should read --tilt angle--.

COLUMN 30:

Line 4, "+10," should read --+1°,--; and
    Line 7, "ex-directional" should read --x-directional--.

COLUMN 32:

Line 34, "and 64.66°" should read --are 64.66°--;
    Line 47, "invention's" should read --invention--; and
    Line 49, "("IUPILON H3000" should read --("IUPILON H3000"--.

CERTIFICATE OF CORRECTION (continued)
U.S. Pat. No. 7,670,013 B2

COLUMN 35:

Line 3, "inventions" should read --invention--; and
    Line 63 Claim 2, "GRz, or GRz)" should read --GLz, or GRz)--.

COLUMN 36:

Line 47 Claim 5, "GRz, or GRz)" should read --GLz, or GRz)--.

COLUMN 37:

Line 4 Claim 9, ", the" should read --, and the--; and
    Line 11 Claim 11, ", the" should read --, and the--.